United States Patent
Takagishi et al.

(10) Patent No.: US 9,147,411 B2
(45) Date of Patent: Sep. 29, 2015

(54) MAGNETIC RECORDING AND REPRODUCING DEVICE

(71) Applicant: KABUSHIKI KAISHA TOSHIBA, Tokyo (JP)

(72) Inventors: Masayuki Takagishi, Tokyo (JP); Hitoshi Iwasaki, Tokyo (JP); Kenichiro Yamada, Tokyo (JP); Yousuke Isowaki, Kanagawa (JP); Kohsuke Harada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/627,003

(22) Filed: Feb. 20, 2015

(65) Prior Publication Data

US 2015/0243308 A1    Aug. 27, 2015

(30) Foreign Application Priority Data

Feb. 24, 2014    (JP) .................................. 2014-033199

(51) Int. Cl.
*G11B 5/39* (2006.01)
*G11B 5/11* (2006.01)

(52) U.S. Cl.
CPC ................ *G11B 5/3912* (2013.01); *G11B 5/11* (2013.01)

(58) Field of Classification Search
CPC ............... G11B 5/3932; G11B 5/3912; G11B 2005/3996; G11B 5/10; G11B 5/11; G11B 5/3906
USPC .................................. 360/319, 324.12, 125.3
See application file for complete search history.

(56) References Cited

U.S. PATENT DOCUMENTS 6,885,527 B1    4/2005    Ju et al.
8,400,734 B2 *  3/2013    Yamada et al. ............ 360/125.3
(Continued)

FOREIGN PATENT DOCUMENTS

JP    2002-217473       8/2002
JP    2004259330 A  *  9/2004
(Continued)

OTHER PUBLICATIONS

Childress, "Reader, Writer, Tape, Overcoats I," Abstracts, Jan. 17, 2013, pp. 573-574.
Tuggle et al., "Shield Design for Enhanced Reader Resolution," IEEE Transactions on Magnetics, Jul. 2013, 49:3729-32.

*Primary Examiner* — Will J Klimowicz
(74) *Attorney, Agent, or Firm* — Finnegan, Henderson, Farabow, Garrett & Dunner, L.L.P.

(57) ABSTRACT

According to one embodiment, a magnetic recording and reproducing device includes magnetic recording medium and a magnetic head. The magnetic recording medium includes a first surface. A plurality of bits is provided in the first surface. Each of the bits has a direction of magnetization corresponding to recorded information. The magnetic head includes a reproducing unit. The reproducing unit senses the direction of magnetization. The reproducing unit includes a first shield, a second shield, a first magnetic layer, a second magnetic layer, a third magnetic layer, a fourth magnetic layer, an intermediate layer, a first nonmagnetic layer, and a second nonmagnetic layer. The first and the second nonmagnetic layers include at least one selected from ruthenium, copper, and tantalum. A distance between the first shield and the second shield is not less than 3 times and not more than 7 times a length of each of the bits.

20 Claims, 12 Drawing Sheets

(56) References Cited

U.S. PATENT DOCUMENTS

2013/0107395 A1* 5/2013 Nagasawa et al. .............. 360/75
2013/0293225 A1* 11/2013 Singleton et al. ............. 324/252

FOREIGN PATENT DOCUMENTS

| JP | 2005203063 A | * | 7/2005 |
| JP | 2013-97828 | | 5/2013 |

* cited by examiner

MAGNETIC RECORDING AND REPRODUCING DEVICE

CROSS-REFERENCE TO RELATED APPLICATIONS

This application is based upon and claims the benefit of priority from Japanese Patent Application No. 2014-033199, filed on Feb. 24, 2014; the entire contents of which are incorporated herein by reference.

FIELD

Embodiments described herein relate generally to a magnetic recording and reproducing device.

BACKGROUND

There is a magnetic recording and reproducing device in which, for example, a magnetic head having a spin-valve structure is used in a hard disk drive. In such a magnetic recording and reproducing device, it is desirable to increase the resolution of the reproduction as the linear recording density of the recording medium is increased.

DETAILED DESCRIPTION

Figure 1A:
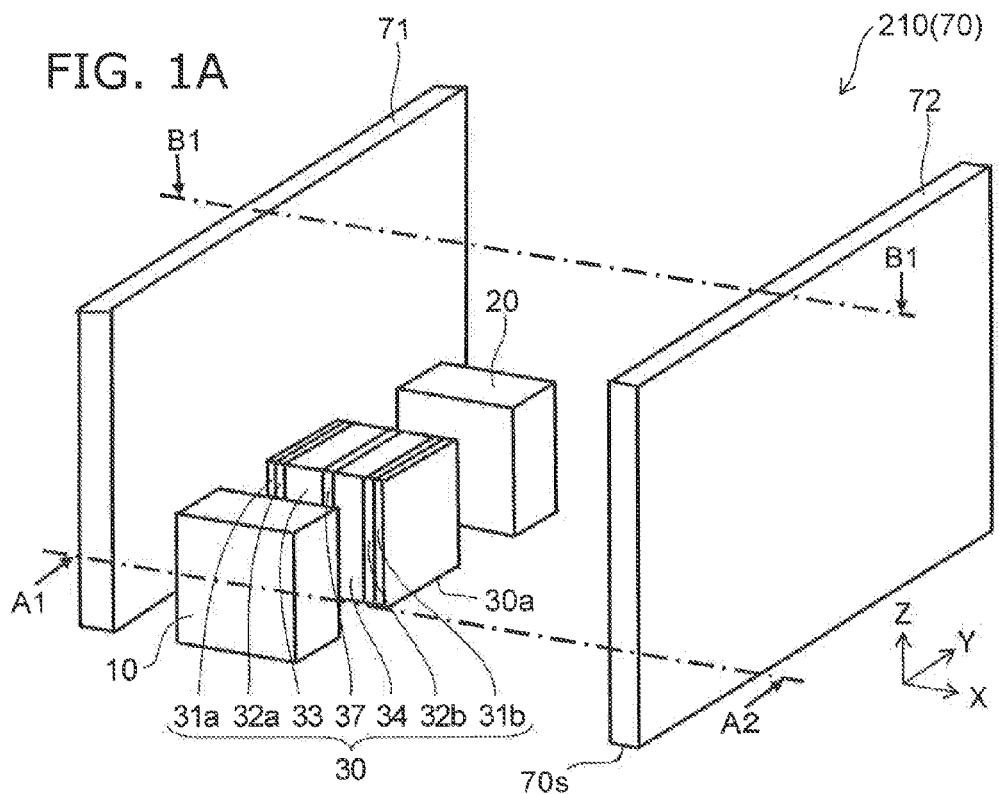
FIG. 1A to FIG. 1C are schematic views showing a magnetic head according to a first embodiment.

According to one embodiment, a magnetic recording and reproducing device includes magnetic recording medium and a magnetic head. The magnetic recording medium includes a first surface. A plurality of bits is provided in the first surface. Each of the bits has a direction of magnetization corresponding to recorded information. The magnetic head includes a reproducing unit having a second surface opposing the first surface. The reproducing unit senses the direction of magnetization. The reproducing unit including a first shield, a second shield, a first magnetic layer, a second magnetic layer, a third magnetic layer, a fourth magnetic layer, an intermediate layer, a first nonmagnetic layer, and a second nonmagnetic layer. The second shield is separated from the first shield in a first direction parallel to the second surface. The first magnetic layer is provided between the first shield and the second shield. A direction of magnetization of the first magnetic layer is fixed. The second magnetic layer is provided between the first magnetic layer and the second shield. A direction of magnetization of the second magnetic layer is changeable. The third magnetic layer is provided between the first shield and the first magnetic layer. A direction of magnetization of the third magnetic layer is changeable. The fourth magnetic layer is provided between the second magnetic layer and the second shield. A direction of magnetization of the fourth magnetic layer is changeable. The intermediate layer is provided between the first magnetic layer and the second magnetic layer. The first nonmagnetic layer is provided between the first shield and the third magnetic layer. The first nonmagnetic layer includes at least one selected from ruthenium, copper, and tantalum. The second nonmagnetic layer is provided between the fourth magnetic layer and the second shield. The second nonmagnetic layer includes at least one selected from ruthenium, copper, and tantalum. A first distance between the first shield and the second shield is not less than 3 times and not more than 7 times a length of each of the bits along the first direction. A length along the first direction of the first nonmagnetic layer is 2 nanometers or less.

Embodiments will now be described with reference to the drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

Figure 1B:
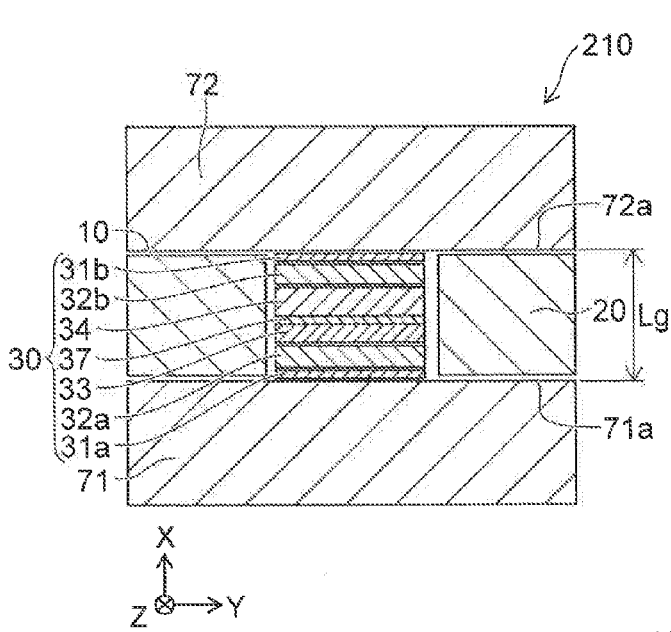
Figure 1C:
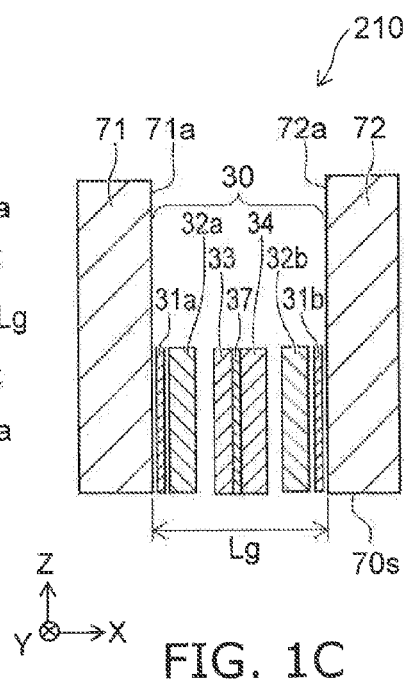

FIG. 1A to FIG. 1C are schematic views illustrating a magnetic head according to a first embodiment.

FIG. 1A is a schematic perspective view. For easier viewing of the drawing in FIG. 1A, the insulating portions are not shown; and some of the components are illustrated as being separated from each other. FIG. 1B is a line A1-A2 cross-sectional view of FIG. 1A. FIG. 1C is a line B1-B2 cross-sectional view of FIG. 1A.

As shown in FIG. 1A to FIG. 1C, a reproducing unit 70 (a magnetoresistance effect element 210) includes a first shield 71, a second shield 72, a first hard bias layer 10, a second hard bias layer 20, and a stacked body 30. The first hard bias layer 10 is provided between the first shield 71 and the second shield 72.

For example, the magnetic head 110 according to the embodiment is included with a magnetic recording medium in a magnetic recording and reproducing device.

Figure 2:
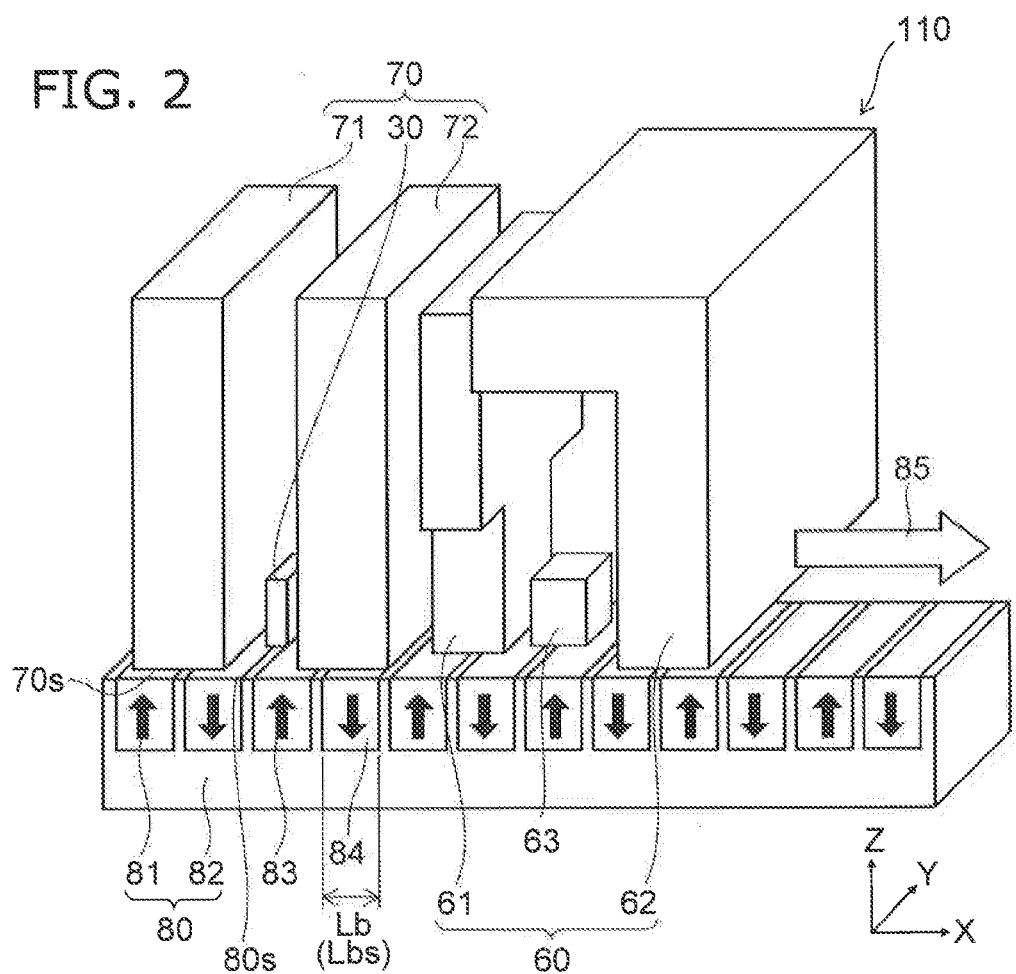
FIG. 2 is a schematic perspective view showing the configuration of the magnetic head according to the first embodiment.

FIG. 2 is a schematic perspective view illustrating the configuration of the magnetic head according to the first embodiment.

Figure 3:
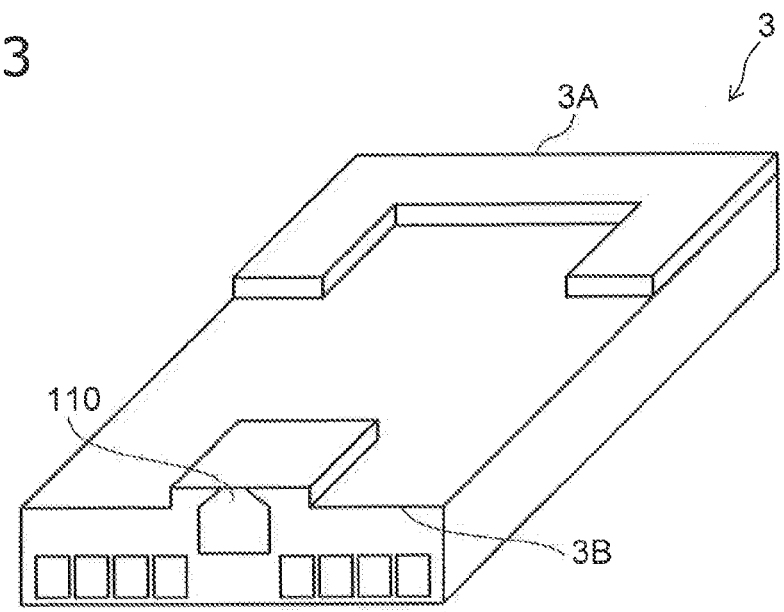
FIG. 3 is a schematic perspective view showing the configuration of a head slider to which the magnetic head according to the first embodiment is mounted.

FIG. 3 is a schematic perspective view illustrating the configuration of a head slider to which the magnetic head according to the first embodiment is mounted.

An overview of the configuration and an overview of the operations of the magnetic head according to the embodiment are described using FIG. 2 and FIG. 3.

As shown in FIG. 2, the magnetic head 110 includes the reproducing unit 70 (the reproducing head unit). In the example, the magnetic head 110 further includes a write unit 60 (a write head unit). The magnetoresistance effect element 210 according to the embodiment is used as the reproducing unit 70.

In FIG. 2, some of the components included in the reproducing unit 70 (the magnetoresistance effect element 210) are not shown.

The write unit 60 includes, for example, a major electrode 61 and a write unit return path 62. In the magnetic head 110, the write unit 60 may further include, for example, a portion that assists the writing operation such as a spin torque oscillator 63 (STO), etc. The write unit 60 may have any configuration in the magnetic head 110.

For example, the stacked body 30, the first shield 71, and the second shield 72 are provided in the reproducing unit 70.

The components of the reproducing unit 70 and the components of the write unit 60 are separated from each other by a not-shown insulator such as, for example, alumina, etc.

As shown in FIG. 3, the magnetic head 110 is mounted to a head slider 3. The head slider 3 includes, for example, $Al_2O_3$/TiC, etc. The head slider 3 moves relative to a magnetic recording medium 80 while flying over or contacting the magnetic recording medium 80 such as a magnetic disk, etc.

The head slider 3 has, for example, an air inflow side 3A and an air outflow side 3B. The magnetic head 110 is disposed at the side surface of the air outflow side 36 of the head slider 3 or the like. Thereby, the magnetic head 110 that is mounted to the head slider 3 moves relative to the magnetic recording medium 80 while flying over or contacting the magnetic recording medium 80.

As shown in FIG. 2, the magnetic recording medium 80 includes, for example, a medium substrate 82, and a magnetic recording layer 81 provided on the medium substrate 82. The magnetic recording medium 80 moves relative to the magnetic head 110 along a medium movement direction 85. For example, the medium movement direction 85 corresponds to a direction (a first direction) from the first shield 71 toward the second shield 72.

The magnetic recording layer 81 includes multiple bits 84. In other words, the magnetic recording medium 80 has a recording surface 80s (a first surface); and the multiple bits 84 are provided in the recording surface 80s. For example, at least some of the multiple bits 84 are arranged in the direction of the medium movement direction 85. Each of the multiple bits 84 has a direction of magnetization corresponding to recorded information. The length along the medium movement direction 85 of the bit 84 corresponds to a bit length Lb. In other words, the bit length Lb is the length of each of the multiple bits 84 along the first direction.

For example, the bit length can be confirmed from the relative speed of the reproduction signal and the head medium. Or, for example, the bit length Lb can be confirmed using magnetic force microscopy (MFM).

Figure 4:
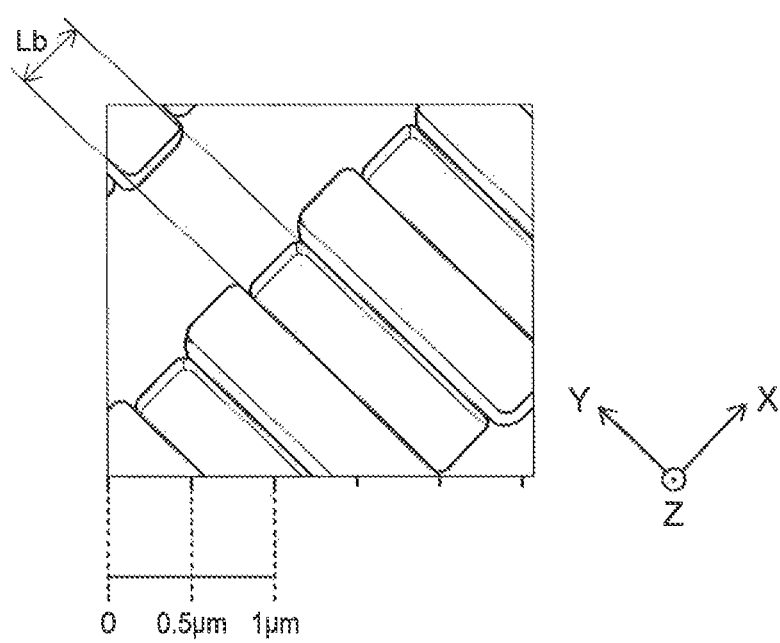
FIG. 4 is a schematic view showing the magnetic recording medium.

FIG. 4 is a schematic view illustrating the magnetic recording medium.

FIG. 4 is a schematic view of an image of the magnetic recording medium 80 observed using MFM. Thus, the bit length Lb can be measured by observing the magnetic recording medium 80 using MFM.

The bit length Lb is, for example, not less than 10 nanometers (nm) and not more than 100 nm. The shortest bit length Lb among the bit lengths Lb of the bits 84 sensed by the magnetic head 110 is a minimum bit length Lbs. The minimum bit length Lbs is, for example, not less than 6 nm and not more than 15 nm. For example, the recording density of the magnetic recording medium 80 is 2 terabits/square inch or more.

A magnetization 83 of each of the multiple bits 84 is controlled by a magnetic field applied from the write unit 60. Thereby, the writing operation is implemented.

The reproducing unit 70 senses the direction of the magnetization 83 of the magnetic recording layer 81. The reproducing unit 70 is disposed to oppose the magnetic recording medium 80 when sensing the direction of the magnetization 83. The reproducing unit 70 has a medium-opposing surface 70s (a second surface, for example, an air bearing surface (ABS)) opposing the recording surface 80s. The magnetic recording medium 80 moves relative to the magnetic head 110 along the medium movement direction 85. Thereby, the reproduction operation is performed.

A stacking direction (a first direction) from the first shield 71 toward the second shield 72 is taken as an X-axis direction. One direction perpendicular to the X-axis direction is taken as a Y-axis direction. A direction perpendicular to the X-axis direction and perpendicular to the Y-axis direction is taken as a Z-axis direction.

The first direction is, for example, a direction parallel to the medium-opposing surface 70s. The second shield 72 is separated from the first shield 71 in the first direction.

The second hard bias layer 20 is provided between the first shield 71 and the second shield 72. The second hard bias layer 20 is separated from the first hard bias layer 10 in a second direction intersecting the stacking direction (the first direction). The second direction is, for example, the Y-axis direction.

Here, "stacking" includes not only the state in which multiple layers are overlaid with mutual contact but also the case of being overlaid with another layer inserted therebetween.

As shown in FIG. 1A to FIG. 1C, the stacked body 30 is provided between the first shield 71 and the second shield 72 and between the first hard bias layer 10 and the second hard bias layer 20. The stacked body 30 includes a first nonmagnetic layer 31a, a first interference layer 32a, a fixed magnetic layer 33, an intermediate layer 37, a free magnetic layer 34, a second interference layer 32b, and a second nonmagnetic layer 31b.

The first nonmagnetic layer 31a is provided between the first shield 71 and the second shield 72 and between the first hard bias layer 10 and the second hard bias layer 20. The first interference layer 32a (the third magnetic layer) is provided between the first nonmagnetic layer 31a and the second shield 72. The fixed magnetic layer 33 (the first magnetic layer) is provided between the first interference layer 32a and the second shield 72. The intermediate layer 37 is provided between the fixed magnetic layer 33 and the second shield 72. The free magnetic layer 34 (the second magnetic layer) is provided between the intermediate layer 37 and the second shield 72. The second interference layer 32b (the fourth magnetic layer) is provided between the free magnetic layer 34 and the second shield 72. The second nonmagnetic layer 31b is provided between the second interference layer 32b and the second shield 72.

In other words, the first magnetic layer (the fixed magnetic layer 33) is provided between the first shield 71 and the second shield 72. The second magnetic layer (the free magnetic layer 34) is provided between the first magnetic layer and the second shield 72. The third magnetic layer (the first interference layer 32a) is provided between the first shield 71 and the first magnetic layer. The fourth magnetic layer (the second interference layer 32b) is provided between the second magnetic layer and the second shield 72. The intermediate layer 37 is provided between the first magnetic layer and the second magnetic layer. The first nonmagnetic layer 31a is provided between the first shield 71 and the third magnetic layer. The second nonmagnetic layer 31b is provided between the fourth magnetic layer and the second shield 72.

In other words, the hard bias layers (the first hard bias layer 10 and the second hard bias layer 20) are arranged with the free magnetic layer 34 between the first shield 71 and the second shield 72 in a plane perpendicular to the first direction.

For example, in the case where the magnetoresistance effect element 210 is applied to a magnetic head, the medium-opposing surface 70s is set in the magnetoresistance effect element 210. A lower surface 30a of the stacked body 30 is the surface on the medium-opposing surface 70s side. A not-shown protective film, etc., may be provided at the medium-opposing surface 70s. For example, the protective film may include carbon which is a nonmagnetic material. The thickness of the protective film is, for example, not less than 1 nanometer (nm) and not more than 3 nm.

In this specific example, the X-axis direction is a parallel to the medium-opposing surface 70s. In such a case, "parallel" includes not only the case where the X-axis direction and the medium-opposing surface 70s are strictly parallel but also the case where the X-axis direction is tilted at a small angle from the medium-opposing surface 70s. For example, the X-axis direction may be tilted within plus or minus 10 degrees from the medium-opposing surface 70s. The X-axis direction matches the first direction.

The fixed magnetic layer 33 may include, for example, a ferromagnetic material such as iron (Fe), cobalt (Co), nickel (Ni), an FeCo alloy, an FeNi alloy, a Heusler alloy, etc. The thickness (the length along the X-axis direction) of the fixed magnetic layer 33 is, for example, not less than 1 nm and not more than 10 nm. The direction of the magnetization of the fixed magnetic layer 33 is fixed.

The free magnetic layer 34 may include, for example, a ferromagnetic material such as Fe, Co, Ni, an FeCo alloy, an FeNi alloy, a Heusler alloy, etc. The thickness (the length along the X-axis direction) of the free magnetic layer 34 is, for example, not less than 1 nm and not more than 10 nm. The direction of the magnetization of the free magnetic layer 34 is changeable.

At least one selected from the first interference layer 32a and the second interference layer 32b includes at least one selected from iron, cobalt, nickel, an iron-cobalt alloy, and an iron-nickel alloy. The first interference layer 32a includes, for example, at least one selected from Fe, Co, Ni, an FeCo alloy, and an FeNi alloy. The second interference layer 32b includes, for example, at least one selected from Fe, Co, Ni, an FeCo alloy, and an FeNi alloy. The thickness (the length along the X-axis direction) of the first interference layer 32a is, for example, not less than 4 nm and not more than 20 nm. The first interference layer 32a and the second interference layer 32b are, for example, soft magnetic layers. The direction of the magnetization of the first interference layer 32a and the direction of the magnetization of the second interference layer 32b change according to the external magnetic field.

The first nonmagnetic layer 31a includes at least one selected from ruthenium (Ru), copper (Cu), and tantalum (Ta). The second nonmagnetic layer 31b includes at least one selected from Ru, Cu, and Ta. For example, the first nonmagnetic layer 31a and the second nonmagnetic layer 31b include Ru or Cu. The thickness (the length along the X-axis direction) of the first nonmagnetic layer 31a is, for example, not less than 0.4 nm and not more than 2 nm. The thickness of the second nonmagnetic layer 31b is, for example, not less than 0.4 nm and not more than 2 nm. These nonmagnetic layers are, for example, conductive.

The first interference layer 32a and the free magnetic layer 34 are strongly coupled magnetically. The first interference layer 32a is loosely coupled magnetically with the first shield 71. The absolute value of the exchange coupling energy between the magnetization of the first interference layer 32a and the magnetization of the first shield 71 is, for example, not less than 0.05 erg/square centimeter (erg/cm$^2$) and not more than 0.2 erg/cm$^2$. The distance between the first interference layer 32a and the first shield 71 is, for example, not less than 0.4 nm and not more than 2 nm. For example, the strength of the exchange coupling between the first interference layer 32a and the first shield 71 is adjusted by the first nonmagnetic layer 31a.

The second interference layer 32b and the free magnetic layer 34 have magnetostatic coupling. The second interference layer 32b is loosely coupled magnetically with the second shield 72. The absolute value of the exchange coupling energy between the magnetization of the second interference layer 32b and the magnetization of the second shield 72 is, for example, not less than 0.05 erg/cm$^2$ and not more than 0.2 erg/cm$^2$. The distance between the second interference layer 32b and the second shield 72 is, for example, not less than 0.4 nm and not more than 2 nm. For example, the exchange coupling between the second interference layer 32b and the second shield 72 is adjusted by the second nonmagnetic layer 31b.

The intermediate layer 37 includes, for example, at least one selected from Mg, Al, O, Cu, and Ru.

The magnetoresistance effect element 210 has, for example, a spin-valve structure. In the example, a tunnel magneto-resistive (TMR) effect is utilized. CPP (Current Perpendicular-to-Plane)-TMR in which a current is caused to flow in the stacking direction of the stacked body 30 is used in the structure of the magnetoresistance effect element 210.

Specifically, the recorded signal is sensed by the electrical resistance of the magnetoresistance effect element 210. A voltage is applied to the free magnetic layer 34 via the first shield 71 and the second shield 72. A current is conducted in the free magnetic layer 34 via the first nonmagnetic layer 31a, the first interference layer 32a, the fixed magnetic layer 33, the second interference layer 32b, and the second nonmagnetic layer 31b. The direction of the magnetization of the free magnetic layer 34 changes due to the direction of the magnetization 83. Thereby, the electrical resistance of the magnetoresistance effect element 210 changes. The reproduction operation is implemented by sensing the direction of the magnetization 83 of the magnetic recording medium 80 by sensing the resistance of the magnetoresistance effect element 210.

For example, the Z-axis direction is the height direction. For example, the X-axis direction is aligned with the recording track movement direction (the down-track direction, i.e., the medium movement direction 85) of the magnetic recording medium 80. For example, the Y-axis direction is aligned with the recording track width direction (the track width direction) of the magnetic recording medium 80. The track width direction regulates the bit width. For example, the write unit 60 is arranged with the reproducing unit 70 along the X-axis direction, For example, there are cases where the medium movement direction 85 is tilted from the X-axis direction within plus or minus 20 degrees due to the relative position of the magnetic recording medium 80 performing the reproduction. Accordingly, being "aligned" in such a case includes not only the case where the X-axis direction is strictly parallel to the medium movement direction 85 but also, for example, the case of being tilted within plus or minus 20 degrees.

For example, the first shield 71 has a first shield surface 71*a* on the second shield 72 side. The second shield 72 has a second shield surface 72*a* on the first shield 71 side. The distance between the first shield surface 71*a* and the second shield surface 72*a* (the distance between the first shield 71 and the second shield 72) corresponds to a gap length Lg (a first distance). For example, the length along the X-axis direction of the stacked body 30 corresponds to the gap length Lg. In the embodiment, the gap length Lg is set to be not less than 3 times and not more than 7 times the bit length Lb. For example, the gap length Lg is set to be not less than 3 times and not more than 7 times the minimum bit length Lbs.

As described above, the first interference layer 32*a* and the second interference layer 32*b* are provided in the embodiment of the invention. Thereby, a magnetic recording and reproducing device having a higher resolution of reproduction can be provided.

Figure 5A:
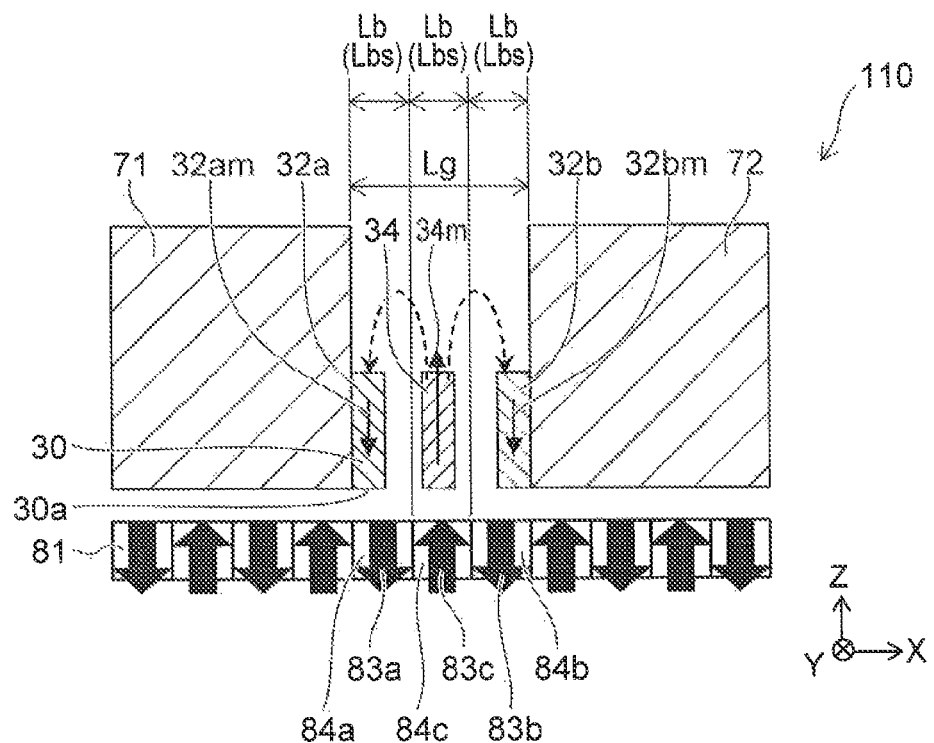
FIG. 5A and FIG. 5B are schematic cross-sectional views showing characteristics of the magnetic head according to the first embodiment.
Figure 5B:
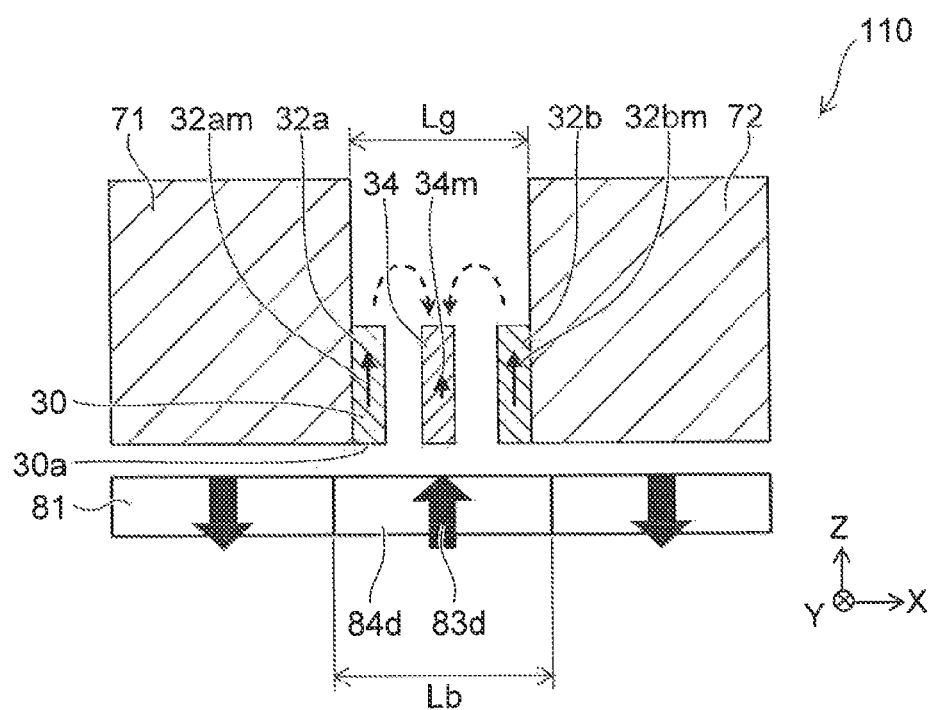

FIG. 5A and FIG. 5B are schematic cross-sectional views illustrating characteristics of the magnetic head according to the first embodiment.

In the example as shown in FIG. 5A, the gap length Lg of the magnetic recording layer 81 is 3 times the bit length Lb. For example, the bit length Lb is the minimum bit length Lbs. In other words, the lower surface 30*a* of the stacked body 30 opposes three bits 84.

For example, a first bit 84*a* is disposed to be separated from the first interference layer 32*a* in the Z-axis direction. A second bit 84*b* is disposed to be separated from the second interference layer 32*b* in the Z-axis direction. A third bit 84*c* is disposed between the first bit 84*a* and the second bit 84*b*.

The angle between the direction of a first bit magnetization 83*a* of the first bit 84*a* and the direction of a third bit magnetization 83*c* of the third bit 84*c* is, for example, 180 degrees. The angle between the direction of a second bit magnetization 83*b* of the second bit 84*b* and the direction of the third bit magnetization 83*c* is, for example, 180 degrees. These angles include not only the case of being strictly 180 degrees but also, for example, the case of being tilted within plus or minus 20 degrees.

For example, the direction of the first bit magnetization 83*a*, the direction of the second bit magnetization 83*b*, and the direction of the third bit magnetization 83*c* are aligned with the Z-axis direction.

The first interference layer 32*a* and the second interference layer 32*b* are, for example, soft magnetic layers. The direction of a first interference magnetization 32*am* of the first interference layer 32*a* is aligned with the direction of the first bit magnetization 83*a*. The direction of a second interference magnetization 32*bm* of the second interference layer 32*b* is aligned with the direction of the second bit magnetization 83*b*. The magnetization (a free magnetization 34*m*) of the free magnetic layer 34 is aligned with the direction of the third bit magnetization 83*c*. In such a case, being "aligned" includes not only the case where the direction of the magnetization is strictly parallel to the Z-axis direction but also, for example, the case of being tilted within plus or minus 20 degrees.

The direction of the free magnetization 34*m* is subjected to interference from the magnetostatic field generated by the first interference magnetization 32*am* and the second interference magnetization 32*bm*. In the example, the magnetostatic field interference promotes the alignment of the direction of the free magnetization 34*m* with the direction of the third bit magnetization 83*c*. Thereby, the output that is sensed by the reproducing unit 70 is improved.

In the example as shown in FIG. 5B, the bit length Lb of the magnetic recording layer 81 is longer than the gap length Lg. For example, the bit length Lb is 3 times the gap length Lg or more. The lower surface 30*a* of the stacked body 30 opposes one bit 84. A fourth bit 84*d* is disposed to be separated from the stacked body 30 in the Z-axis direction.

For example, the direction of the first interference magnetization 32*am*, the direction of the second interference magnetization 32*bm*, and the direction of the free magnetization 34*m* are aligned with the direction of a fourth bit magnetization 83*d*. In such a case, being "aligned" includes not only the case where the direction of the magnetization is strictly parallel to the Z-axis direction but also, for example, the case of being tilted within plus or minus 20 degrees.

The direction of the free magnetization 34*m* is subjected to interference from the magnetostatic field generated by the first interference magnetization 32*am* and the second interference magnetization 32*bm*. In the example, the magnetostatic field interference obstructs the alignment of the direction of the free magnetization 34*m* with the direction of the fourth bit magnetization 83*d*. Thereby, the output that is sensed by the reproducing unit 70 degrades.

In the magnetic recording and reproducing device according to the embodiment, in the case where the bit length Lb is relatively short compared to the gap length Lg as shown in FIG. 5A, the output can be increased; and the resolution of the reproduction can be increased.

Figure 6:
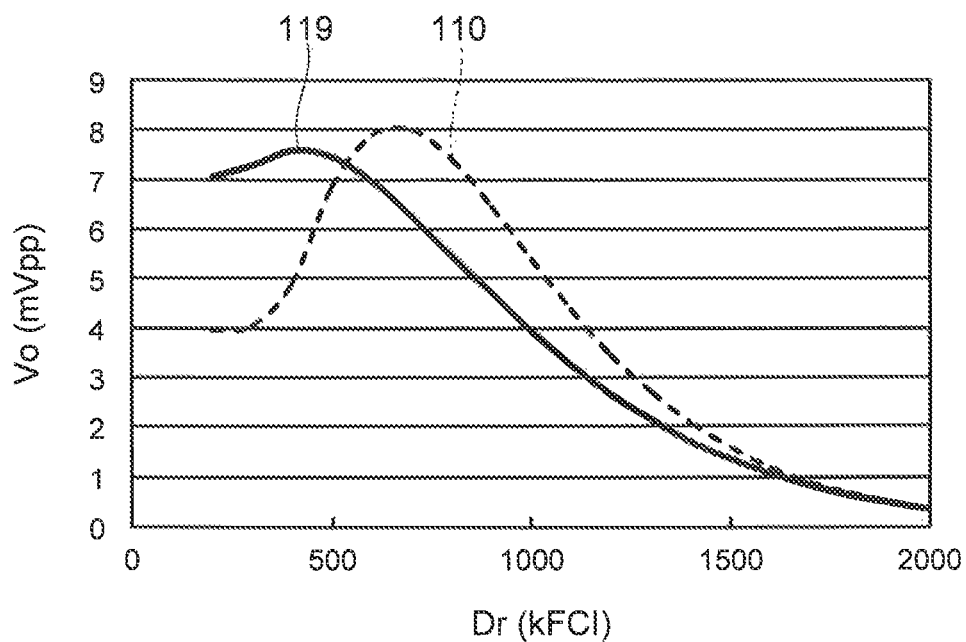
FIG. 6 is a graph of characteristics of magnetic heads.

FIG. 6 is a graph of characteristics of magnetic heads.

FIG. 6 shows the output of a magnetic head 119 of a reference example and the magnetic head 110 used in the magnetic recording and reproducing device according to the embodiment. The data is obtained by simulation.

The horizontal axis of FIG. 6 is a linear recording density Dr (kilo flux changes per inch (kFCI)). For example, the linear recording density Dr corresponds to the frequency at which the signal is sensed by the reproducing unit 70. The frequency increases as the linear recording density Dr increases. The linear recording density Dr is dependent on the bit length Lb. For example, the bit length Lb when the linear recording density Dr is 2000 kFCI corresponds to the minimum bit length Lbs. However, the minimum bit length Lbs and the linear recording density Dr are not limited thereto. For example, the linear recording density Dr may be greater than or less than 2000 kFCI.

In the example shown in FIG. 5A, the bit length Lb is relatively short compared to the gap length Lg. In such a case, for example, the linear recording density Dr is high; and the frequency of the sensing is high. In the example shown in FIG. 5B, the bit length Lb is relatively long compared to the gap length Lg. In such a case, for example, linear recording density Dr is low; and the frequency of the sensing is low.

The vertical axis of FIG. 6 is an output Vo (millivolts peak to peak) that is sensed by the reproducing unit 70. The output Vo is, for example, the potential difference (millivolts) between the average value of the maximum value (the positive peak) and the average value of the minimum value (the negative peak) for the electrical signal waveform obtained when reproducing a medium recorded with a constant linear density.

The first shield, the second shield, the free magnetic layer, the intermediate layer, and the fixed magnetic layer are provided in the magnetic head 119 of the reference example as well. The first interference layer 32a, the second interference layer 32b, the first nonmagnetic layer 31a, and the second interference layer 32b are not provided in the magnetic head 119. Otherwise, the configuration of the magnetic head 119 is similar to that of the magnetic head 110.

The output Vo of the magnetic head 110 is higher than the output Vo of the magnetic head 119 of the reference example in the intermediate frequency domain (e.g., where the linear recording density Dr is not less than 500 kFCI and not more than 1500 kFCI). In the low frequency domain (e.g., where the linear recording density Dr is 500 kFCI or less), the output Vo of the magnetic head 110 is lower than the output Vo of the magnetic head 119 of the reference example. The interference layers are provided in the magnetic head. Thereby, the output at the intermediate frequencies is enhanced; and the resolution of the reproduction can be increased.

Figure 7:
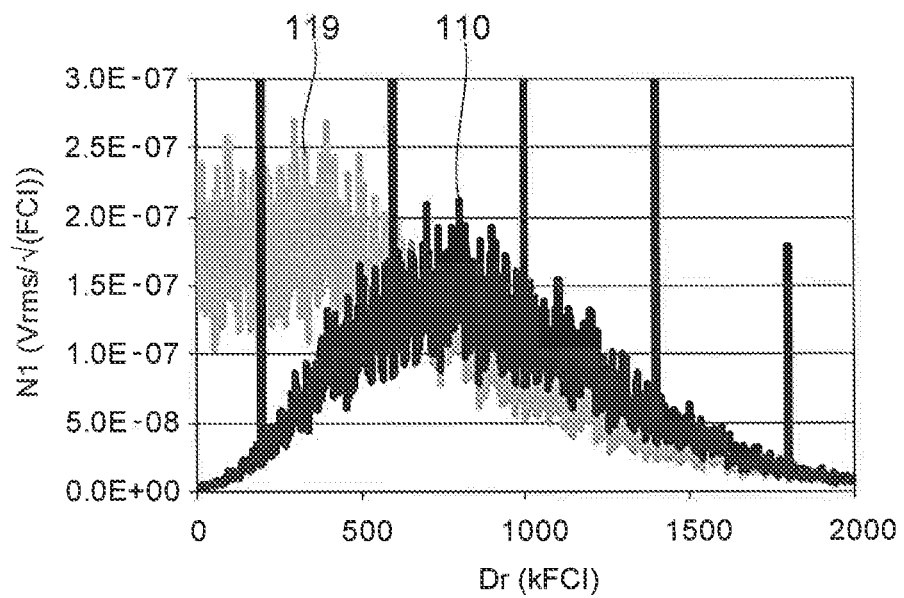
FIG. 7 is a graph of characteristics of the magnetic heads.

FIG. 7 is a graph of characteristics of the magnetic heads.

FIG. 7 shows the noise of the magnetic heads 110 and 119. The data is obtained by simulation. The horizontal axis of FIG. 7 is the linear recording density Dr. The vertical axis of FIG. 7 is noise N1 $(Vrms/(FCI)^{1/2})$.

For the magnetic head 110 as shown in FIG. 7, the noise decreases in the low frequency domain; and the noise increases at the intermediate frequencies. For example, the noise N1 of the magnetic head 110 is less than the noise N1 of the magnetic head 119 in the region where the linear recording density Dr is 500 kFCI or less. For example, the noise N1 of the magnetic head 110 is greater than the noise N1 of the magnetic head 119 in the region where the linear recording density Dr is 800 kFCI or more.

For example, the reproduction (signal detection) error rate of the magnetic head is dependent on the output Vo for intermediate or higher frequencies. Also, the reproduction error rate is dependent on the integral of the noise from the low frequencies to the high frequencies.

The integral of the noise of the magnetic head 110 is smaller than the integral of the noise of the magnetic head 119. Further, for the intermediate frequencies and higher, the output Vo of the magnetic head 110 is larger than the output Vo of the magnetic head 119. Thereby, the reproduction characteristics and the SN ratio (signal-to-noise ratio) drastically improve in the magnetic head 110.

Thus, in the magnetic head 110, the output is affected by the gap length Lg (the total thickness) per bit length Lb. The gap length Lg per bit length Lb has a strong correlation with the linear recording density Dr (the frequency) at which the output is enhanced.

Figure 8:
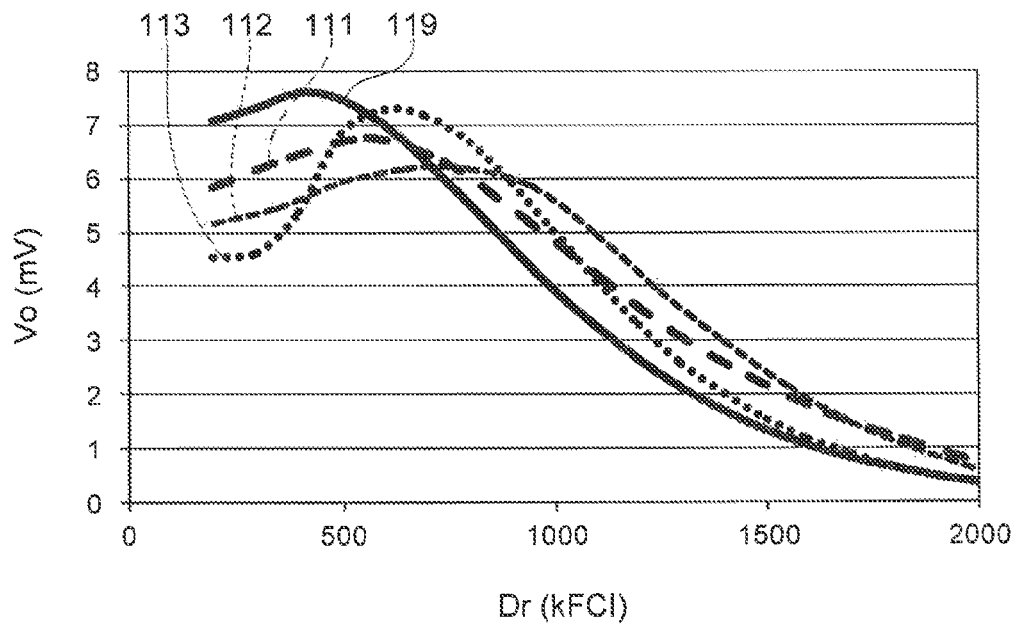
FIG. 8 is a graph of characteristics of the magnetic heads.

FIG. 8 is a graph of characteristics of the magnetic heads.

FIG. 8 shows the output of the magnetic heads 111, 112, and 113 according to the embodiment and the magnetic head 119 of the reference example. The vertical axis of FIG. 8 is the output Vo (my); and the horizontal axis of FIG. 8 is the linear recording density Dr (kFCI).

The configuration described in regard to the magnetic head 110 is applicable to each of the magnetic heads 111, 112, and 113.

In the magnetic head 111, the gap length Lg is 4 times the minimum bit length Lbs. In the magnetic head 112, the gap length Lg is 5 times the minimum bit length Lbs. In the magnetic head 113, the gap length Lg is 7 times the minimum bit length Lbs.

In the example, the maximum linear recording density is 2000 kFCI. In other words, the bit length Lb when the linear recording density Dr is 2000 kFCI corresponds to the minimum bit length Lbs.

As described in regard to FIG. 5A, the output is enhanced when the gap length Lg is about 3 times the bit length Lb. The output Vo is enhanced when the linear recording density Dr corresponds to a bit length Lb of about ⅓ of the gap length Lg.

In the case where the gap length Lg is 4 times the minimum bit length Lbs, the output Vo is enhanced when the bit length Lb is ⅘ of the minimum bit length Lbs. In other words, in the magnetic head 111, the output Vo is enhanced when the linear recording density is ¾ of the maximum linear recording density.

In the case where the gap length Lg is 5 times the minimum bit length Lbs, the output Vo is enhanced when the bit length Lb is ⅗ of the minimum bit length Lbs. In other words, in the magnetic head 112, the output Vo is enhanced when the linear recording density is ⅗ of the maximum linear recording density.

In the case where the gap length Lg is 7 times the minimum bit length Lbs, the output Vo is enhanced when the bit length Lb is ⅞ of the minimum bit length Lbs. In other words, in the magnetic head 113, the output Vo is enhanced when the linear recording density is 3/7 of the maximum linear recording density.

Figure 9:
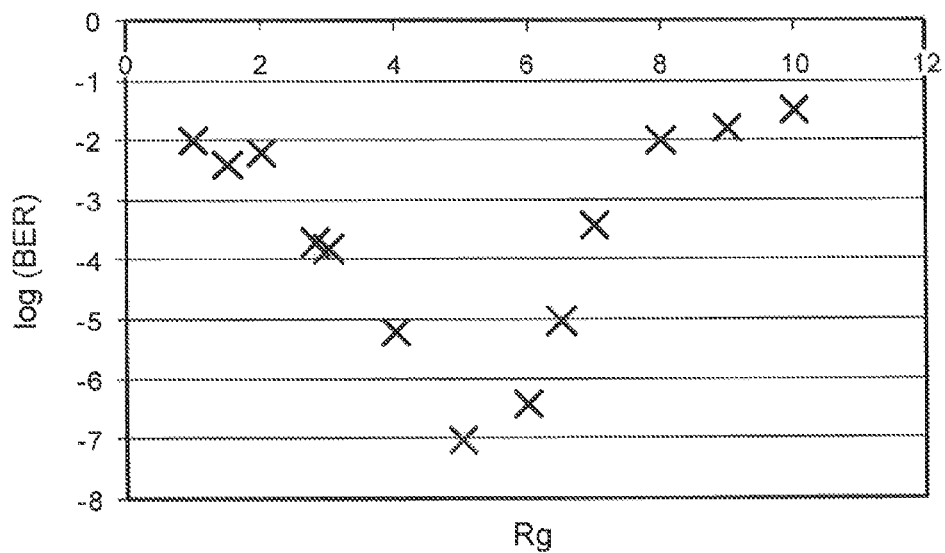
FIG. 9 is a graph of a characteristic of a magnetic head.

FIG. 9 is a graph of a characteristic of a magnetic head.

FIG. 9 shows the dependence of a reproduction error rate BER on the gap length Lg. For example, in the magnetic head 110, the gap length Lg is changed with respect to the bit length Lb (e.g., the minimum bit length Lbs). The horizontal axis of FIG. 9 is a ratio Rg of the gap length Lg and the bit length Lb. Namely, ratio Rg=(gap length Lg)/(bit length Lb). The vertical axis of FIG. 9 is the logarithm of the reproduction error rate BER.

As shown in FIG. 9, the reproduction error rate BER decreases abruptly in, for example, the region where the ratio Rg is not less than 3 and not more than 7. Thus, the gap length Lg is set to be about 3 times to 7 times the bit length Lb. Thereby, the frequency at which the output is enhanced by the interference layers (the first and second interference layers 32a and 32b) matches the frequency of the output that affects the reproduction error rate BER. The reproduction error rate improves abruptly.

The magnetic thicknesses of the first and second interference layers 32a and 32b are set to be somewhat large. Thereby, the coupling between the first interference layer 32a and the free magnetic layer 34 and the coupling between the second interference layer 32b and the free magnetic layer 34 become strong. The magnetic thickness is the product of the saturation magnetization and the thickness of the film (the layer).

Figure 10:
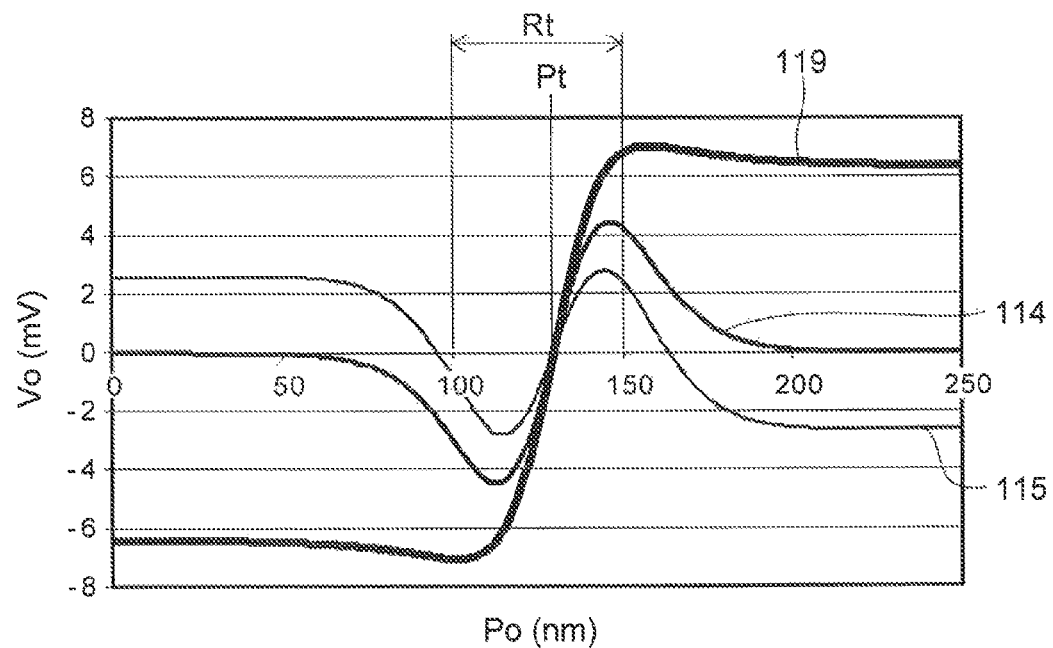
FIG. 10 is a graph of characteristics of the magnetic heads.

FIG. 10 is a graph of characteristics of the magnetic heads.

FIG. 10 shows the isolated reproduction waveforms of the output Vo of the magnetic heads 114, 115, and 119. The horizontal axis of FIG. 10 is a position Po along the down-track direction. In the example, the position where the sign of the output changes when the position Po is between 100 nm and 150 nm corresponds to a medium magnetization transition position Pt (the position where the magnetization of the magnetic recording medium 80 transitions). The region of the position Pt vicinity is a medium transition region Rt. For example, the medium transition region Rt is the region where the position Po is not less than 100 nm and not more than 150 nm.

The configuration described in regard to the magnetic head 110 is applicable to the magnetic head 114. In the magnetic head 114, the magnetic thickness of the first interference layer 32a is 3 times the magnetic thickness of the free magnetic layer 34. The magnetic thickness of the second interference layer 32b is 3 times the magnetic thickness of the free magnetic layer 34.

The configuration described in regard to the magnetic head 110 is applicable to the magnetic head 115. In the magnetic head 115, the magnetic thickness of the first interference layer 32a is 4 times the magnetic thickness of the free magnetic layer 34. The magnetic thickness of the second interference layer 32b is 4 times the magnetic thickness of the free magnetic layer 34.

For example, in the magnetic head 119 of the reference example as shown in FIG. 10, the output Vo when the position Po is at the vicinity of 250 nm is substantially constant (a baseline). For example, the output of the baseline corresponds to the output for a substantially uniform magnetic field. The output changes abruptly in the medium transition region Rt. The output becomes zero at the position Pt. In the magnetic head 119, the isolated reproduction waveform is a substantially square waveform.

In the magnetic head 114 and the magnetic head 115, the magnetization of the free magnetic layer 34 is subjected to interference from the magnetization of the first interference layer 32a and the magnetization of the second interference layer 32b. Thereby, the absolute value of the output of the baseline (e.g., the output when the position Po is 250 nm) becomes small. The absolute value of the output of the baseline of the magnetic head 114 is less than the absolute value of the output of the baseline of the magnetic head 119. The absolute value of the output of the baseline of the magnetic head 115 is less than the absolute value of the output of the baseline of the magnetic head 119.

For example, in the magnetic head 114 in which the magnetic thickness of the interference layer is 3 times the magnetic thickness of the free magnetic layer 34, there are cases where the uniform magnetic field from the magnetic recording medium 80 is canceled by the magnetic field from the interference layer. For example, the absolute value of the output of the baseline of the magnetic head 114 is a value near zero.

The output at the baseline reverses when the magnetic thickness of the interference layer is not less than 3 times the magnetic thickness of the free magnetic layer 34. In other words, in the magnetic head 115 in which the magnetic thickness of the interference layer is 4 times the magnetic thickness of the free magnetic layer 34, the sign of the output of the baseline is the reverse of the sign of the output of the baseline of the magnetic head 119.

For example, in the case where the magnetic thickness of the interference layer is set to be not less than 4 times the magnetic thickness of the free magnetic layer 34, there are cases where the value of the output at the baseline is substantially the same as the maximum value of the output in the medium transition region Rt. When the interference between the waveforms becomes large for high density, there are cases where the reproduction error rate BER undesirably is affected greatly.

Figure 11:
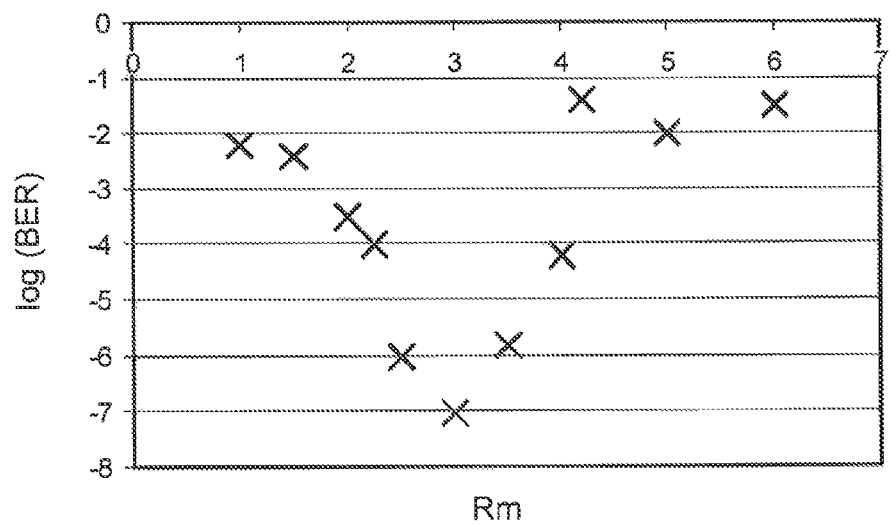
FIG. 11 is a graph of a characteristic of a magnetic head.

FIG. 11 is a graph of a characteristic of a magnetic head.

FIG. 11 shows the relationship between the magnetic thickness of the interference layer and the reproduction error rate BER. The horizontal axis of FIG. 11 is a film thickness ratio Rm of the magnetic thickness of the first interference layer 32a and the magnetic thickness of the free magnetic layer 34. In other words, the film thickness ratio Rm=(the magnetic thickness of the first interference layer 32a)/(the magnetic thickness of the free magnetic layer 34). In the example, the magnetic thickness of the second interference layer 32b is set to be the same as the magnetic thickness of the first interference layer 32a.

As shown in FIG. 11, the reproduction error rate BER is small in the region where the film thickness ratio Rm is not less than 2 and not more than 4. In the embodiment, for example, the magnetic thickness of the first interference layer 32a is set to be not less than 2 times and not more than 4 times the magnetic thickness of the free magnetic layer 34. For example, the magnetic thickness of the second interference layer 32b is set to be not less than 2 times and not more than 4 times the magnetic thickness of the free magnetic layer 34. Thereby, the reproduction error rate BER can be greatly improved. The resolution of the reproduction can be increased.

For example, the magnetization of the first interference layer 32a and the magnetization of the second interference layer 32b are loosely fixed by the bias magnetic field. Thereby, for example, the generation of large noise is suppressed; and the abrupt degradation of the reproduction error rate BER can be suppressed.

For example, the bias magnetic field from the first hard bias layer 10 and the second hard bias layer 20 is applied to the first interference layer 32a and the second interference layer 32b. Thereby, the magnetization of the first interference layer 32a and the magnetization of the second interference layer 32b are loosely fixed. However, in the case where the interference layers have thick magnetic thicknesses, the bias magnetic field flows in the shield direction because the interference layers are proximal to the shield (the first or second shield 71 or 72). There are cases where the bias magnetic field is not applied to the interference layers sufficiently. There are cases where the fixing by the first hard bias layer 10 and the second hard bias layer 20 is insufficient.

The first interference layer 32a and the first shield 71 are magnetically coupled. The second interference layer 32b and the second shield 72 are magnetically coupled. Thereby, the magnetization of the first interference layer 32a and the magnetization of the second interference layer 32b can be fixed sufficiently.

Figure 12:
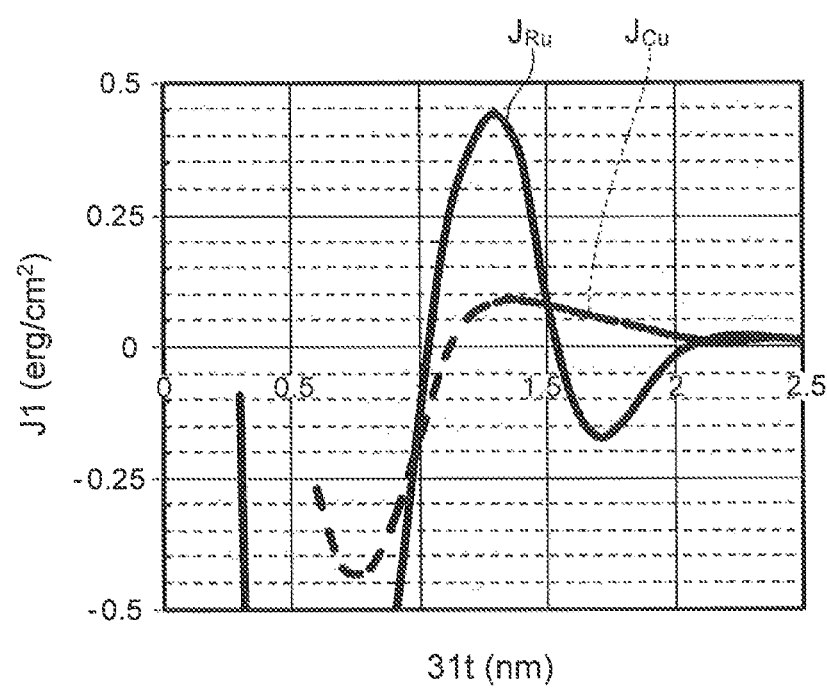
FIG. 12 is a graph of characteristics of the magnetic head.

FIG. 12 is a graph of characteristics of the magnetic head.

FIG. 12 shows the relationship between a thickness 31t of the first nonmagnetic layer 31a and an exchange coupling energy 31. The vertical axis of FIG. 12 is the exchange coupling energy 31 (erg/cm$^2$) between the first interference layer 32a and the first shield 71.

In the case where the first nonmagnetic layer 31a includes Ru, the exchange coupling is ferromagnetic or antiferromagnetic. In the case where the first nonmagnetic layer 31a includes Cu, the exchange coupling is, for example, antiferromagnetic. As shown in FIG. 12, an exchange coupling energy $J_{Ru}$ in the case where Ru is used is small when the thickness 31t of the first nonmagnetic layer 31a is 2 nm or more. An exchange coupling energy $J_{Cu}$ in the case where Cu is used is small when the thickness 31t of the first nonmagnetic layer 31a is 2 nm or more. In the embodiment, the thickness of the first nonmagnetic layer 31a is set to be 2 nm or less.

On the other hand, in the case where the exchange coupling energy 31 is too large, the coupling between the first interference layer 32a and the first shield 71 becomes too strong. For example, there are cases where the magnetization of the first interference layer 32a and the magnetization of the first shield 71 are considered to be a single magnetization. In such a case, the output of the magnetic head is not easily enhanced by the magnetization of the interference layers. For example, it is favorable for the absolute value of the exchange coupling energy 31 to be not less than 0.05 and not more than 0.2.

For example, the thickness of the first nonmagnetic layer 31a is set to be not less than 0.4 nm and not more than 2 nm. Similarly, for example, the thickness of the second nonmagnetic layer 31b is set to be not less than 0.4 nm and not more than 2 nm. It is favorable for the thickness of the first nonmagnetic layer 31a and the thickness of the second nonmagnetic layer 31b to be set by considering the exchange coupling energy 31 and the materials that are used. For example, in the case where the first nonmagnetic layer 31a includes Ru, it is favorable for the thickness of the first nonmagnetic layer 31a to be not less than 1.6 nm and not more than 1.9 nm. For example, in the case where the first nonmagnetic layer 31a includes Cu, it is favorable for the thickness of the first nonmagnetic layer 31a to be not less than 1.0 nm and not more than 1.1 nm, or not less than 1.2 nm and not more than 1.7 nm. Thereby, the magnetization of the free magnetic layer 34 is subjected to interference from the magnetization of the first interference layer 32a and the magnetization of the second interference layer 32b; and the output of the magnetic head 110 is enhanced. The resolution of the reproduction can be increased.

Second Embodiment

Figure 13A:
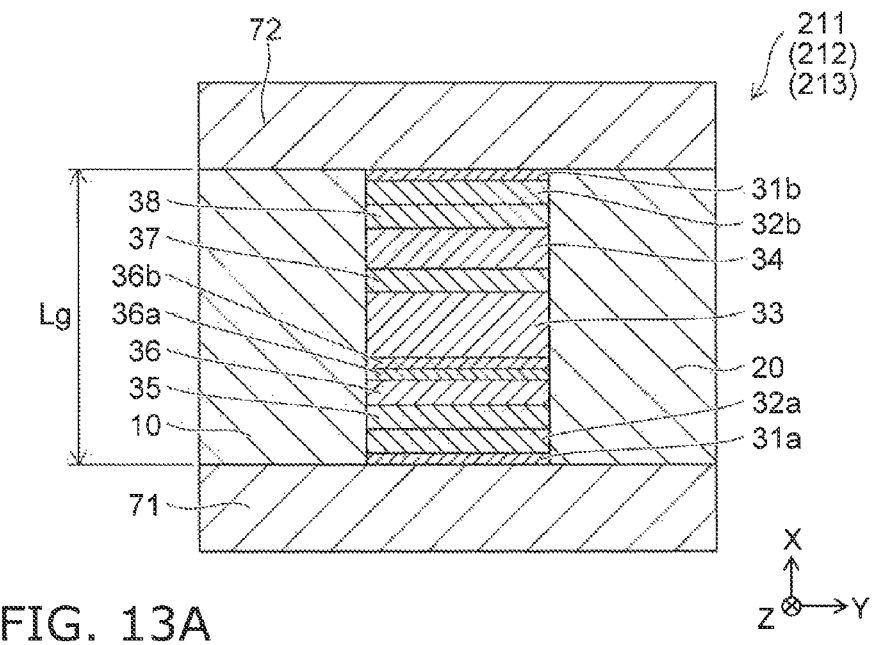
FIG. 13A and FIG. 13B are schematic cross-sectional views showing the configuration of a magnetic head according to a second embodiment.
Figure 13B:
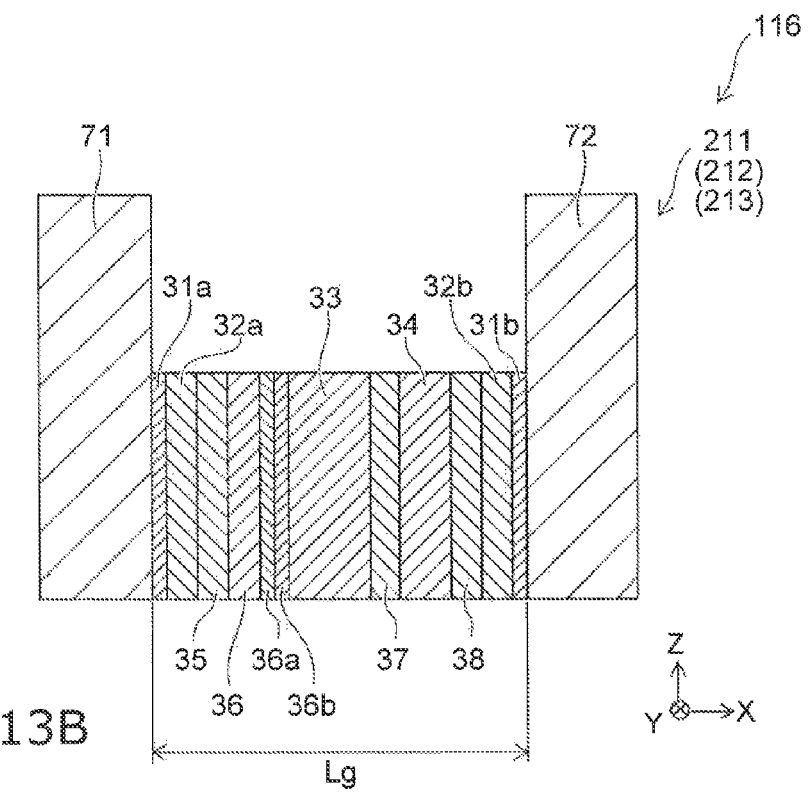

FIG. 13A and FIG. 13B are schematic cross-sectional views illustrating the configuration of a magnetic head according to a second embodiment.

For example, instead of the magnetoresistance effect element 210, one of the magnetoresistance effect elements 211, 212, or 213 is mounted to the magnetic head 116 according to the second embodiment. Otherwise, the configuration of the magnetic head 116 is similar to that of the magnetic head 110. The magnetoresistance effect elements 211, 212, and 213 will be described.

As shown in FIG. 13A and FIG. 13B, the first shield 71, the second shield 72, the first hard bias layer 10, the second hard bias layer 20, the first nonmagnetic layer 31a, the second nonmagnetic layer 31b, the first interference layer 32a, the second interference layer 32b, the fixed magnetic layer 33, the free magnetic layer 34, and the intermediate layer 37 are provided in the magnetoresistance effect element 211 as well. The configurations described in regard to the magnetoresistance effect element 210 are applicable to these components.

A seed layer 35, an antiferromagnetic layer 36, a magnetic layer 36a, a Ru layer 36b, and a capping layer 38 are further provided in the magnetoresistance effect element 211. For example, the magnetic layer 36a and the fixed magnetic layer 33 are strongly coupled antiferromagnetically with the Ru layer 36b interposed.

The seed layer 35 is provided between the first interference layer 32a and the fixed magnetic layer 33. The seed layer 35 includes, for example, at least one selected from Ru, Ni, Fe, and chrome (Cr). The thickness (the length along the X-axis direction) of the seed layer 35 is, for example, not less than 0.5 nm and not more than 5 nm.

The antiferromagnetic layer 36 is provided between the seed layer 35 and the fixed magnetic layer 33. The antiferromagnetic layer 36 includes, for example, at least one selected from platinum (Pt), manganese (Mn), palladium (Pd), iridium (Ir), and rhodium (Rh). The antiferromagnetic layer 36 may include, for example, an antiferromagnetic material such as PtMn, PdPtMn, IrMn, RuRhMn, etc. The magnetization of the fixed magnetic layer 33 is fixed by the magnetization of the antiferromagnetic layer 36.

The magnetic layer 36a is provided between the antiferromagnetic layer 36 and the fixed magnetic layer 33. The magnetic layer 36a includes, for example, a CoFe alloy layer. The Ru layer 36b is provided between the magnetic layer 36a and the fixed magnetic layer 33.

The capping layer 38 is provided between the free magnetic layer 34 and the second interference layer 32b. The capping layer 38 includes, for example, at least one selected from Ru and Ta. The thickness (the length along the X-axis direction) of the capping layer 38 is, for example, not less than 2 nm and not more than 10 nm.

The capping layer 38 includes, for example, Ru. Ru is disposed between the free magnetic layer 34 and the second interference layer 32b in which the magnetization moves more easily than in the second shield 72. The spin diffusion length of Ru is extremely short. Thereby, the magnetoresistance effect between the second interference layer 32b and the free magnetic layer 34 is suppressed. Similarly, in the case where the seed layer includes Ru, the magnetoresistance effect between the first interference layer 32a and the free magnetic layer 34 is suppressed.

The magnetoresistance effect element 212 will now be described. The magnetoresistance effect element 212 senses the direction of the magnetization recorded in a magnetic recording medium 80a. The recording density of the magnetic recording medium 80a is 1 terabit per square inch. The linear recording density Dr is 2000 kBPI. The minimum bit length Lbs is 12.3 nm. Otherwise, the configuration of the magnetic recording medium 80a is similar to that of the magnetic recording medium 80.

A configuration similar to the configuration described in regard to the magnetoresistance effect element 211 is applicable to the magnetoresistance effect element 212.

In the magnetoresistance effect element 212, the first nonmagnetic layer 31a includes Ru. The thickness of the first nonmagnetic layer 31a is 1.7 nm.

A CoFe alloy layer and a NiFe alloy layer are stacked in the first interference layer 32a. The CoFe alloy layer is provided between the NiFe alloy layer and the first nonmagnetic layer 31a. The thickness of the CoFe alloy is 5 nm. The thickness of the NiFe alloy layer is 10 nm.

A Ru layer and a NiFeCr alloy layer are stacked in the seed layer 35 of the magnetoresistance effect element 212. The Ru layer is provided between the NiFeCr alloy layer and the first interference layer 32a. The thickness of the Ru layer is 1 nm. The thickness of the NiFeCr alloy layer is 2 nm.

The antiferromagnetic layer 36 includes an IrMn layer. The thickness of the IrMn layer is 5 nm. The magnetic layer 36a includes a CoFe layer. The thickness (the length along the X-axis direction) of the magnetic layer 36a is 3 nm; and the thickness (the length along the X-axis direction) of the Ru layer 36b is 0.7 nm.

The intermediate layer 37 includes Cu. The thickness (the length along the X-axis direction) of the intermediate layer 37 is 2.5 nm.

The free magnetic layer 34 includes an FeCo alloy layer and a NiFe alloy layer. The thickness of the free magnetic layer 34 is 5 nm.

The capping layer 38 includes Ru and Ta. The thickness of the capping layer 38 is 4 nm.

A NiFe alloy layer and a CoFe alloy layer are stacked in the second interference layer 32b. The NiFe alloy layer is provided between the CoFe alloy layer and the capping layer 38. The thickness of the NiFe alloy layer is 10 nm. The thickness of the CoFe alloy layer is 5 nm.

The second nonmagnetic layer 31b includes Ru. The thickness of the second nonmagnetic layer 31b is 1.7 nm.

The height (the length along the Z-axis direction) of the magnetoresistance effect element 212 is, for example, 30 nm. The width (the length along the Y-axis direction) of the magnetoresistance effect element 212 is, for example, 30 nm. The structure of the magnetoresistance effect element 212 is a spin-valve structure using CCP-GMR (Giant Magneto-Resistive effect). There are cases where the output is lower for the spin-valve element using the CCP-GMR than for an element using TMR. However, compared to the case where the interference layers are not provided (the gap length Lg being 27 nm), the SN ratio is improved 4.4 dB by providing the interference layers in the magnetoresistance effect element 212.

The average saturation magnetic flux density of the interference layers is 1.27 teslas; and the magnetic thickness is 19.0 nmT. The magnetic thickness of the free magnetic layer 34 is 6.3 nmT. The film thickness ratio Rm is 3.0. The gap length Lg is 58.2 nm; and the minimum bit length Lbs is 12.3 nm. The ratio Rg is 4.73. In such a case, due to the magnetization of the interference layers, the output becomes large; and the resolution of the reproduction increases.

The magnetoresistance effect element 213 will now be described. The magnetoresistance effect element 213 senses the direction of the magnetization recorded in a magnetic recording medium 80b. The recording density of the magnetic recording medium 80b is 2 terabits per square inch. The linear recording density Dr is 2940 kBPI. The minimum bit length Lbs is 10 nm. Otherwise, the configuration of the magnetic recording medium 80b is similar to that of the magnetic recording medium 80.

A configuration similar to the configuration described in regard to the magnetoresistance effect element 211 is applicable to the magnetoresistance effect element 213. In the magnetoresistance effect element 213, the first nonmagnetic layer 31a includes Cu. The thickness of the first nonmagnetic layer 31a is 1.4 nm.

A CoFe alloy layer and a NiFe alloy layer are stacked in the first interference layer 32a. The CoFe alloy layer is provided between the NiFe alloy layer and the first nonmagnetic layer 31a. The thickness of the CoFe alloy is 3 nm. The thickness of the NiFe alloy layer is 10 nm.

A Ru layer and a NiFeCr alloy layer are stacked in the seed layer 35 of the magnetoresistance effect element 213. The Ru layer is provided between the NiFeCr alloy layer and the first interference layer 32a. The thickness of the Ru layer is 1 nm. The thickness of the NiFeCr alloy layer is 2 nm.

An IrMn layer is included in the antiferromagnetic layer 36. The IrMn layer is recessed from the ABS. The magnetic layer 36a includes a CoFe layer. The thickness of the magnetic layer 36a is 3 nm; and the thickness of the Ru layer 36b is 0.7 nm.

The fixed magnetic layer 33 includes a CoFe alloy and a Heusler alloy. The thickness of the fixed magnetic layer 33 is 4 nm.

The intermediate layer 37 includes Cu. The thickness of the intermediate layer 37 is 2.5 nm.

The free magnetic layer 34 includes a Heusler alloy and a NiFe alloy layer. The thickness of the free magnetic layer 34 is 5 nm.

The capping layer 38 includes Ru and Ta. The thickness of the capping layer 38 is 5 nm.

A NiFe alloy layer and a CoFe alloy layer are stacked in the second interference layer 32b. The NiFe alloy layer is provided between the CoFe alloy layer and the capping layer 38. The thickness of the NiFe alloy layer is 10 nm. The thickness of the CoFe alloy layer is 3 nm.

The second nonmagnetic layer 31b includes Cu. The thickness of the second nonmagnetic layer 31b is 1.4 nm.

The height of the magnetoresistance effect element 213 is, for example, 22 nm. The width of the magnetoresistance effect element 212 is, for example, 22 nm. The magnetoresistance effect element 213 is a spin-valve element having a special structure that uses CCP-GMR and in which the IrMn is recessed. A Heusler alloy is included. Thereby, the output is increased. However, there are cases where the output is lower for the spin-valve element using CCP-GMR than for the element using TMR.

In the magnetoresistance effect element 213, the gap length Lg is 49.2 nm. The gap length Lg excluding the thickness of the interference layer is 23 nm, which is large for this density. The ratio Rg is 4.9. In such a case, due to the interference layer, the output becomes large; and the resolution of the reproduction increases.

The magnetic thickness of the free magnetic layer 34 is 5.5 nmT; and the magnetic thickness of the interference layer is 15.7 nmT. The film thickness ratio Rm is 2.9. In such a case, due to the interference layer, the output becomes large; and the resolution of the reproduction increases. The reproduction error rate BER is at a practically usable level.

The spin-valve structure is used widely in a reproducing head used in a hard disk drive. For example, TMR is used as the reproduction principle. For example, the CPP-type is used for the bias current. CPP-TMR is used widely. A fixed magnetic layer, a free magnetic layer, and an intermediate layer (a spacer layer) are provided in the spin-valve structure using CPP-TMR. The magnetization direction of the fixed magnetic layer is used as a reference and does not move. The magnetization direction of the free magnetic layer changes somewhat freely with respect to the external magnetic field. The intermediate layer is provided between the fixed magnetic layer and the free magnetic layer. For example, these layers are provided between the pair of magnetic shields above and below. Thereby, for example, the spatial resolution of the reproduction increases; and the bits of a small pattern can be reproduced.

The reproduction gap (the gap length Lg) is reduced. Thereby, for example, a recording medium that has a large recording density and a small bit length Lb can be realized. In the case of using the magnetoresistance effect element of the reference example in which the interference layers are not provided, it may be estimated that it is favorable for the reproduction gap to be about 20 nm for a recording density of 2 terabits per square inch. It may be estimated that it is favorable for the reproduction gap to be about 13.5 nm for a recording density of 5 terabits per square inch.

However, a non-functional film such as a protective film, a seed layer, etc., an antiferromagnetic material film that fixes the magnetization of the fixed magnetic layer, etc., are provided in the spin-valve structure. Therefore, the gap length of the spin-valve structure is 20 nm or more. It is difficult to realize a recording density of 2 terabits per square inch or more.

For example, a trilayer structure or an actuated structure is used in the magnetoresistance effect element. Thereby, the gap length can be reduced. The trilayer structure is a structure in which the two free magnetic layers and a spacer layer are used without using the fixed magnetic layer. In the actuated structure, the spatial resolution is increased without using the shields. However, the risk is high when changing the structure of the magnetoresistance effect element itself.

For example, an auxiliary magnetic pole is used. Or, the permeability of the shields is increased. This is an attempt to improve the function of the shields. Thereby, for example, the reproduction spatial resolution can be increased without changing the structure of the element. The resolution (the value of the intermediate frequency output divided by the isolated waveform output) is increased by about several % to several tens of %. However, only a slight increase of the recording density can be realized. A large improvement to realize twice the recording density is not possible.

Conversely, the first interference layer 32a and the second interference layer 32b are provided in the magnetoresistance effect element used in the magnetic recording and reproducing device according to the embodiment. Thereby, the resolution is improved by 50% or more; and the reproduction error rate abruptly decreases. Also, the risk is smaller than in the case where the structure is changed such as for the trilayer structure or the actuated structure. According to the embodiment, the resolution of the reproduction can be increased.

For example, there is a magnetoresistance effect element 219a of a reference example in which the fixed magnetic layer 33 is not used. In the magnetoresistance effect element 219a, two free magnetic layers are provided. A nonmagnetic layer is provided between the two free magnetic layers. The magnetoresistance effect element 219a of the reference example is, for example, a trilayer element.

In the magnetoresistance effect element 219a, the first shield 71, the first nonmagnetic layer 31a, the first interference layer 32a, the seed layer 35, a first free magnetic layer 34a, the intermediate layer 37, a second free magnetic layer 34b, the capping layer 38, the second interference layer 32b, the second nonmagnetic layer 31b, and the second shield 72 are stacked in this order.

The configuration of the magnetoresistance effect element 219a corresponds to the configuration of the magnetoresistance effect element 211 in which the antiferromagnetic layer 36, the magnetic layer 36a, the Ru layer 36b, and the fixed magnetic layer 33 are replaced with the first free magnetic layer 34a. Otherwise, the configuration of the magnetoresistance effect element 219a is similar to the configuration described in regard to the magnetoresistance effect element 211.

Namely, the first nonmagnetic layer 31a of the magnetoresistance effect element 219a includes a Ru layer; and the thickness of the first nonmagnetic layer 31a is 1.7 nm. A CoFe alloy layer and a NiFe alloy layer are stacked in the first interference layer 32a. The CoFe alloy layer is provided between the NiFe alloy layer and the first nonmagnetic layer 31a. The thickness of the CoFe alloy is 5 nm. The thickness of the NiFe alloy layer is 10 nm. A Ru layer and a NiFeCr alloy layer are stacked in the seed layer 35. The Ru layer is provided between the NiFeCr alloy layer and the first interference layer 32a. The thickness of the Ru layer is 4 nm. The thickness of the NiFeCr alloy layer is 2 nm. The first free magnetic layer 34a includes a NiFe alloy layer and an FeCo layer. The thickness of the first free magnetic layer 34a is 6 nm. The intermediate layer 37 includes Cu. The thickness of the intermediate layer 37 is 3 nm. The second free magnetic layer 34b includes an FeCo alloy layer and a NiFe alloy layer. The thickness of the second free magnetic layer 34b is 6 nm. The capping layer 38 includes Ru and Ta. The thickness of the capping layer 38 is 6 nm. A NiFe alloy layer and a CoFe alloy layer are stacked in the second interference layer 32b. The NiFe alloy layer is provided between the CoFe alloy layer and the capping layer 38. The thickness of the NiFe alloy layer is 10 nm. The thickness of the CoFe alloy layer is 5 nm. The second nonmagnetic layer 31b includes Ru. The thickness of the second nonmagnetic layer 31b is 1.7 nm.

For example, there is a magnetoresistance effect element 219b of another reference example. The configuration of the magnetoresistance effect element 219b corresponds to the configuration of the magnetoresistance effect element 219a in which the first interference layer 32a and the second interference layer 32b are omitted. In other words, the first interference layer 32a and the second interference layer 32b are not provided in the magnetoresistance effect element 219b. Otherwise, the configuration of the magnetoresistance effect element 219b is similar to the configuration described in regard to the magnetoresistance effect element 219a.

For example, the magnetic medium is reproduced using the magnetoresistance effect element 219a and the magnetoresistance effect element 219b. For example, the magnetic medium recording density is 2 terabits per square inch. In such a case, the SN ratio of the magnetoresistance effect element 219a is improved about 3.0 dB compared to the SN ratio of the magnetoresistance effect element 219b. However, the reproduction error rate BER of the magnetoresistance effect element 219a is not improved compared to the reproduction error rate BER of the magnetoresistance effect element 219b. In other words, in the trilayer element, the improvement of the reproduction error rate BER cannot be expected by providing the interference layers.

Figure 14A:
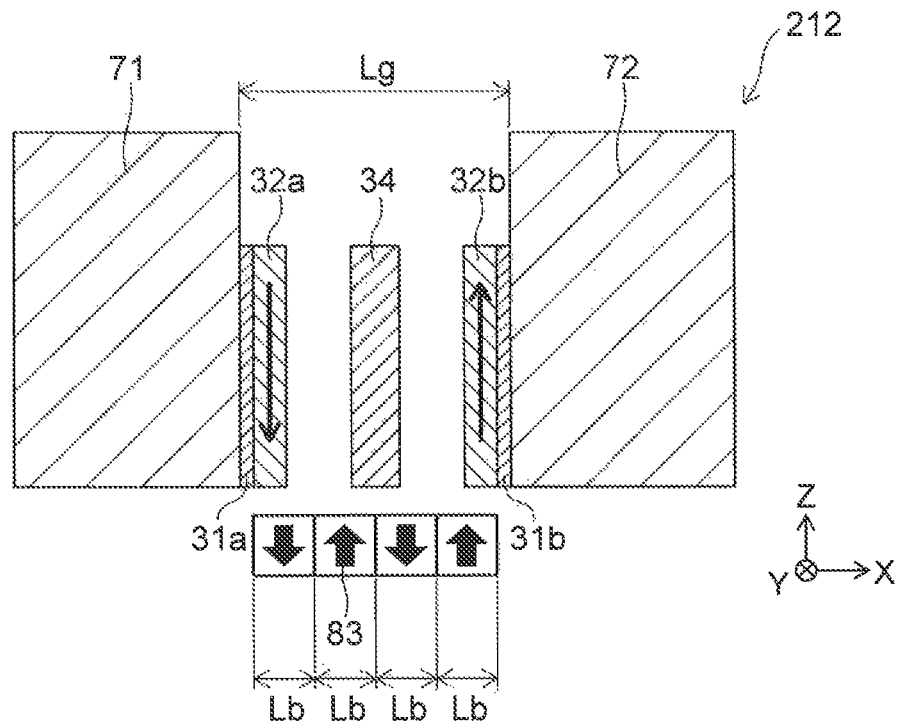
FIG. 14A and FIG. 14B are schematic cross-sectional views showing characteristics of magnetic heads.
Figure 14B:
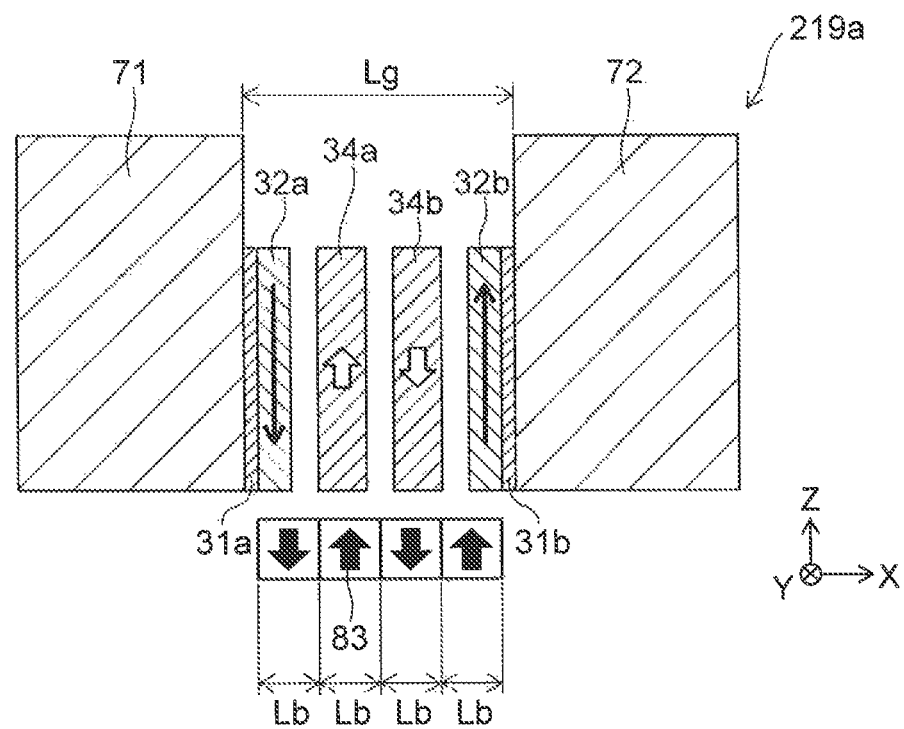

FIG. 14A and FIG. 14B are schematic cross-sectional views illustrating characteristics of magnetic heads.

In the example as shown in FIG. 14A, the gap length Lg of the magnetoresistance effect element 212 is 4 times the bit length Lb. In the example as shown in FIG. 14B, the gap length Lg of the magnetoresistance effect element 219a is 4 times the bit length Lb.

In the spin-valve type element as shown in FIG. 14A, the direction of the magnetization of the first interference layer 32a and the direction of the magnetization of the second interference layer 32b are opposite directions. In the free magnetic layer 34, the magnetic field from the first interference layer 32a and the magnetic field from the second interference layer 32b weaken (e.g., cancel) each other. The magnetic field that is directly applied from the recording medium also is weakened (e.g., canceled). The output is about zero.

On the other hand, in the trilayer element as shown in FIG. 14B, the magnetostatic coupling between the magnetization of the first interference layer 32a and the magnetization of the first free magnetic layer 34a is extremely large. The magnetostatic coupling between the magnetization of the second interference layer 32b and the magnetization of the second free magnetic layer 34b is extremely large. Therefore, there are cases where a large nonlinearity is caused. The improvement of the reproduction error rate BER by the interference layers cannot be expected in an element having a structure (e.g., the trilayer-type or the actuated-type) in which the magnetizations of the multiple free magnetic layers move separately.

Third Embodiment

Figure 15:
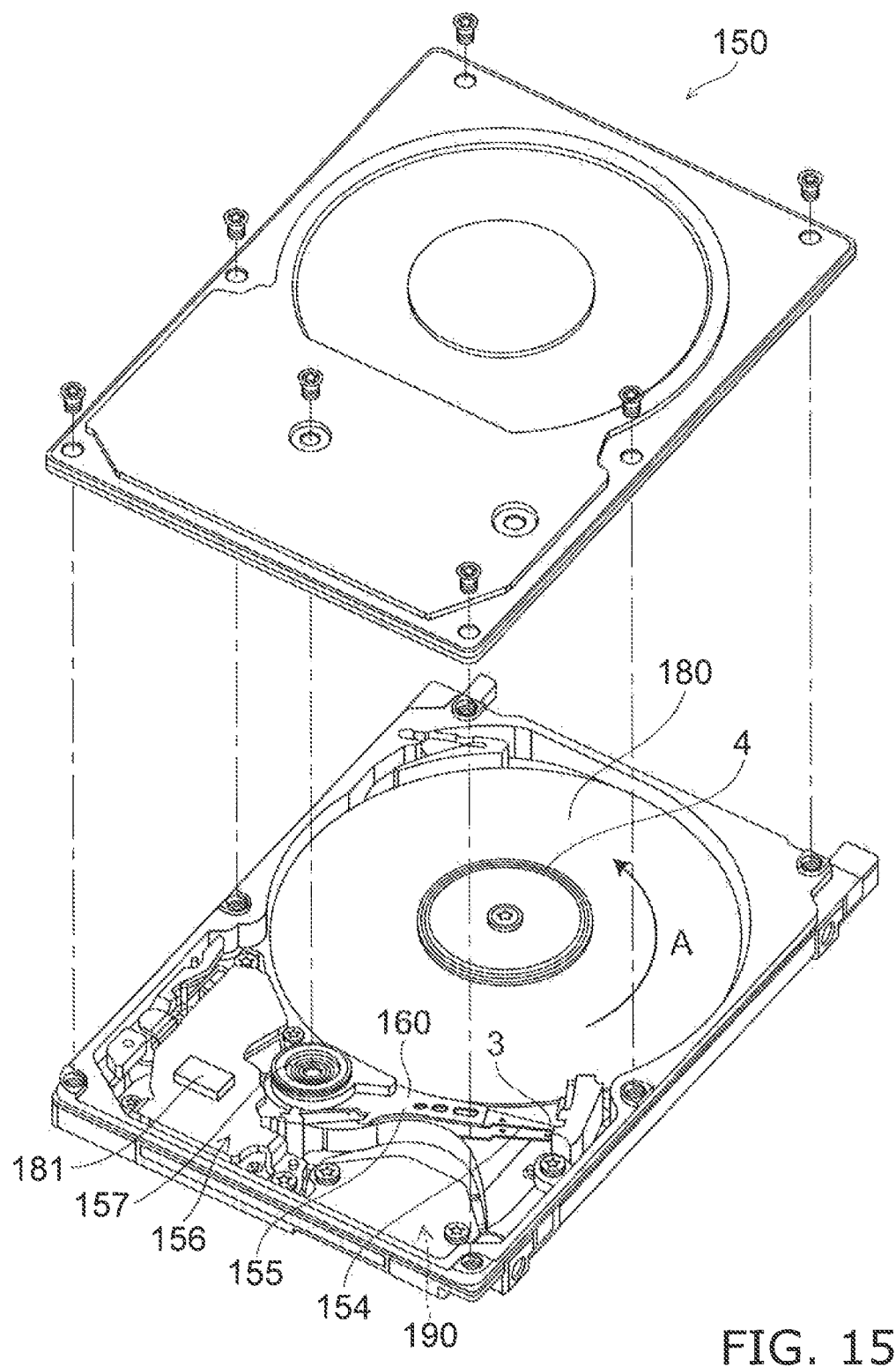
FIG. 15 is a schematic perspective view showing the configuration of a magnetic recording and reproducing device according to a third embodiment.

FIG. 15 is a schematic perspective view illustrating the configuration of a magnetic recording and reproducing device according to a third embodiment.

Figure 16A:
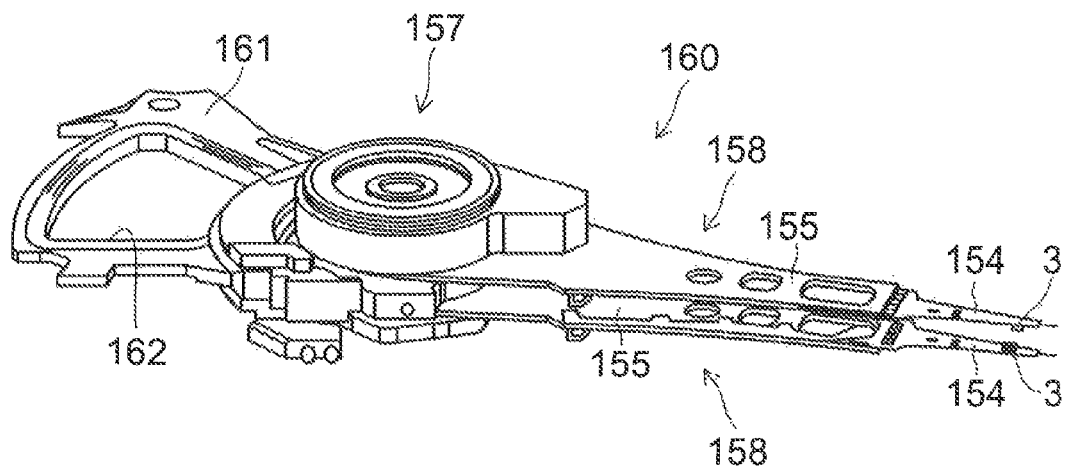
FIG. 16A and FIG. 16B are schematic perspective views showing the configurations of portions of the magnetic recording and reproducing device according to the third embodiment.
Figure 16B:
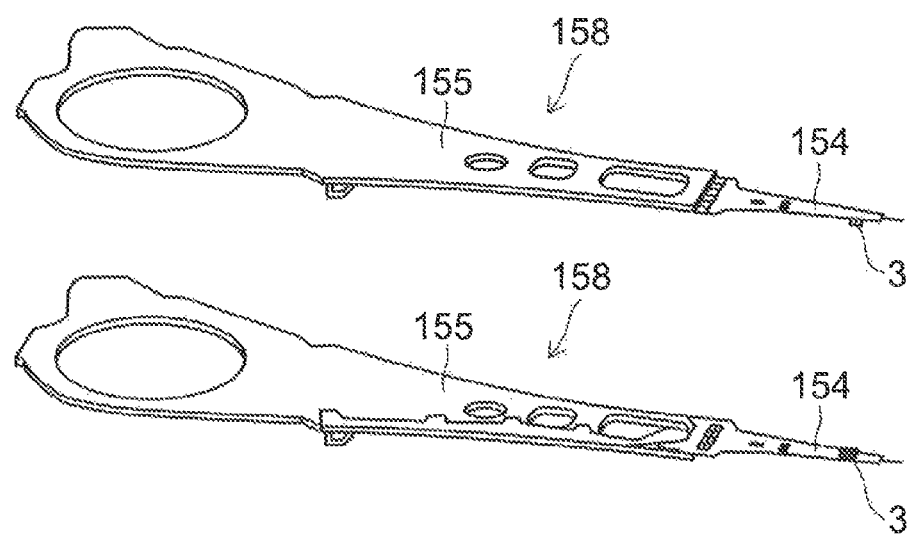

FIG. 16A and FIG. 16B are schematic perspective views illustrating the configurations of portions of the magnetic recording and reproducing device according to the third embodiment.

As shown in FIG. 15, the magnetic recording and reproducing device 150 according to the embodiment is a device that uses a rotary actuator. In the drawing, a recording medium disk 180 is mounted to a spindle motor 4 and is rotated in the direction of arrow A by a motor that responds to a control signal from a drive device controller. The magnetic recording and reproducing device 150 according to the embodiment may include multiple recording medium disks

180. The magnetic recording and reproducing device 150 may include a recording medium 181. For example, the magnetic recording and reproducing device 150 is a hybrid HDD (hard disk drive). The recording medium 181 is, for example, a SSD (Solid State Drive). The recording medium 181 includes, for example, nonvolatile memory such as flash memory, etc.

The head slider 3 that performs the recording/reproducing of the information stored in the recording medium disk 180 has a configuration such as that described above and is mounted to the tip of a suspension 154 having a thin-film configuration. Here, for example, one of the magnetic heads (e.g., the magnetic heads 110 to 116) according to the embodiment described above is mounted at the tip vicinity of the head slider 3.

When the recording medium disk 180 rotates, the medium-opposing surface of the head slider 3 is held above the surface of the recording medium disk 180 at a prescribed fly height by the balance between the downward pressure due to the suspension 154 and the pressure generated by the medium-opposing surface (the ABS) of the head slider 3. A so-called "contact-sliding" head slider 3 that contacts the recording medium disk 180 may be used.

The suspension 154 is connected to one end of an actuator arm 155 that includes a bobbin unit holding a drive coil, etc. A voice coil motor 156 which is one type of linear motor is provided at one other end of the actuator arm 155. The voice coil motor 156 may include a drive coil that is wound onto the bobbin unit of the actuator arm 155, and a magnetic circuit made of a permanent magnet and an opposing yoke that are disposed to oppose each other with the coil interposed. The suspension 154 has one end and one other end; the magnetic head is mounted to the one end of the suspension 154; and the actuator arm 155 is connected to the one other end of the suspension 154.

The actuator arm 155 held by ball bearings provided at two locations on and under a bearing unit 157; and the actuator arm 155 can be caused to rotate and slide unrestrictedly by the voice coil motor 156. As a result, the magnetic head is movable to any position of the recording medium disk 180.

FIG. 16A shows the configuration of a portion of the magnetic recording and reproducing device and is an enlarged perspective view of a head stack assembly 160.

FIG. 16B is a perspective view illustrating a magnetic head assembly (a head gimbal assembly (HGA)) 158 which is a portion of the head stack assembly 160.

As shown in FIG. 16A, the head stack assembly 160 includes the bearing unit 157, the head gimbal assembly 158 that extends from the bearing unit 157, and a support frame 161 that extends from the bearing unit 157 in a direction opposite the HGA and supports a coil 162 of the voice coil motor.

As shown in FIG. 16B, the head gimbal assembly 158 includes the actuator arm 155 that extends from the bearing unit 157, and the suspension 154 that extends from the actuator arm 155.

The head slider 3 is mounted to the tip of the suspension 154. One of the magnetic heads according to the embodiment is mounted to the head slider 3.

In other words, the magnetic head assembly (the head gimbal assembly) 158 according to the embodiment includes the magnetic head according to the embodiment, the head slider 3 to which the magnetic head is mounted, the suspension 154 that has the head slider 3 mounted to the one end, and the actuator arm 155 that is connected to the one other end of the suspension 154.

The suspension 154 includes, for example, lead wires (not shown) that are for writing and reproducing signals, for a heater that adjusts the fly height, for a spin torque oscillator, etc. The lead wires are electrically connected to electrodes of the magnetic head embedded in the head slider 3.

A signal processor 190 is provided to write and reproduce the signals to and from the magnetic recording medium by using the magnetic head. For example, the signal processor 190 is provided on the backside of the drawing of the magnetic recording and reproducing device 150 shown in FIG. 15. The input/output lines of the signal processor 190 are electrically connected to the magnetic head by being connected to electrode pads of the head gimbal assembly 158.

Thus, the magnetic recording and reproducing device 150 according to the embodiment includes a magnetic recording medium, the magnetic head according to the embodiment recited above, a movable unit that is relatively movable in a state in which the magnetic recording medium and the magnetic head are separated from each other or in contact with each other, a position controller that aligns the magnetic head at a prescribed recording position of the magnetic recording medium and a signal processor that writes and reproduces signals to and from the magnetic recording medium by using the magnetic head.

In other words, the recording medium disk 180 is used as the magnetic recording medium recited above.

The movable unit recited above may include the head slider 3.

The position controller recited above may include the head gimbal assembly 158.

Thus, the magnetic recording and reproducing device 150 according to the embodiment includes the magnetic recording medium, the magnetic head assembly according to the embodiment, and the signal processor that writes and reproduces signals to and from the magnetic recording medium by using the magnetic head mounted to the magnetic head assembly.

According to the magnetic recording and reproducing device 150 according to the embodiment, reproduction having a high output and a low resistance is possible by using the magnetic head according to the embodiment recited above. Further, the spin torque noise is suppressed; the decrease of the SN ratio due to the thermal magnetic noise is suppressed; and the spatial resolution can be increased.

The embodiments include the following features.

Feature 1

A magnetic recording and reproducing device, comprising:

a magnetic recording medium including a first surface, multiple bits being provided in the first surface, each of the bits having a direction of magnetization corresponding to recorded information; and a magnetic head including a reproducing unit having a second surface opposing the first surface, the reproducing unit sensing the direction of magnetization, the reproducing unit including:

a first shield;

a second shield separated from the first shield in a first direction parallel to the second surface;

a first magnetic layer provided between the first shield and the second shield, a direction of magnetization of the first magnetic layer being fixed;

a second magnetic layer provided between the first magnetic layer and the second shield, a direction of magnetization of the second magnetic layer being changeable;

a third magnetic layer provided between the first shield and the first magnetic layer, a direction of magnetization of the third magnetic layer being changeable;

a fourth magnetic layer provided between the second magnetic layer and the second shield, a direction of magnetization of the fourth magnetic layer being changeable;

an intermediate layer provided between the first magnetic layer and the second magnetic layer;

a first nonmagnetic layer provided between the first shield and the third magnetic layer, the first nonmagnetic layer including at least one selected from ruthenium, copper, and tantalum; and a second nonmagnetic layer provided between the fourth magnetic layer and the second shield, the second nonmagnetic layer including at least one selected from ruthenium, copper, and tantalum, a first distance between the first shield and the second shield being not less than 3 times and not more than 7 times a length of each of the bits along the first direction, a length along the first direction of the first nonmagnetic layer being not more than 2 nanometers.

Feature 2

The magnetic recording and reproducing device according to feature 1, wherein at least one selected from the third magnetic layer and the fourth magnetic layer includes at least one selected from iron, cobalt, nickel, an iron-cobalt alloy, and an iron-nickel alloy.

Feature 3

The magnetic recording and reproducing device according to feature 1 or 2, wherein a magnetic thickness of the third magnetic layer is not less than 2 times and not more than 4 times a magnetic thickness of the second magnetic layer.

Feature 4

The magnetic recording and reproducing device according to one of features 1 to 3, wherein a length along the first direction of the first nonmagnetic layer is not less than 0.4 nanometers and not more than 2 nanometers.

Feature 5

The magnetic recording and reproducing device according to one of features 1 to 4, wherein the first nonmagnetic layer includes ruthenium, and a length along the first direction of the first nonmagnetic layer is not less than 1.6 nanometers and not more than 1.9 nanometers.

Feature 6

The magnetic recording and reproducing device according to one of features 1 to 5, wherein the first nonmagnetic layer includes copper; and a length along the first direction of the first nonmagnetic layer is not less than 1.2 nanometers and not more than 1.7 nanometers.

Feature 7

The magnetic recording and reproducing device according to one of features 1 to 6, wherein the absolute value of an exchange coupling energy between a magnetization of the third magnetic layer and a magnetization of the first shield is not less than 0.05 erg/square centimeter and not more than 0.2 erg/square centimeter.

Feature 8

The magnetic recording and reproducing device according to one of features 1 to 7, wherein the second magnetic layer includes at least one selected from iron, cobalt, nickel, an iron-cobalt alloy, an iron-nickel alloy, and a Heusler alloy.

Feature 9

The magnetic recording and reproducing device according to one of features 1 to 8, wherein the first magnetic layer includes at least one selected from iron, cobalt, nickel, an iron-cobalt alloy, an iron-nickel alloy, and a Heusler alloy.

Feature 10

The magnetic recording and reproducing device according to one of features 1 to 9, wherein the reproducing unit further includes a seed layer provided between the third magnetic layer and the first magnetic layer, the seed layer including at least one selected from ruthenium, nickel, iron, and chrome.

Feature 11

The magnetic recording and reproducing device according to feature 10, wherein a length along the first direction of the seed layer is not less than 0.5 nanometers and not more than 5 nanometers.

Feature 12

The magnetic recording and reproducing device according to feature 10 or 11, wherein the reproducing unit further includes an antiferromagnetic layer provided between the seed layer and the first magnetic layer, the antiferromagnetic layer including at least one selected from platinum, manganese, palladium, iridium, and rhodium.

Feature 13

The magnetic recording and reproducing device according to one of features 1 to 12, wherein the intermediate layer includes at least one selected from copper and ruthenium.

Feature 14

The magnetic recording and reproducing device according to one of features 1 to 13, wherein the reproducing unit further includes a capping layer provided between the second magnetic layer and the fourth magnetic layer, the capping layer including at least one selected from ruthenium and tantalum.

Feature 15

The magnetic recording and reproducing device according to feature 14, wherein a length along the first direction of the capping layer is not less than 2 nanometers and not more than 10 nanometers.

Feature 15

The magnetic recording and reproducing device according to one of features 1 to 15, wherein a length along the first direction of the third magnetic layer is not less than 4 nanometers and not more than 20 nanometers.

Feature 17

The magnetic recording and reproducing device according to one of features 1 to 16, wherein the reproducing unit further includes a hard bias layer, and the hard bias layer is arranged with the second magnetic layer between the first shield and the second shield in a plane perpendicular to the first direction.

Feature 18

The magnetic recording and reproducing device according to one of features 1 to 17, wherein a minimum value of a length along the first direction of each of the bits is not less than 6 nanometers and not more than 15 nanometers.

Feature 19

The magnetic recording and reproducing device according to one of features 1 to 18, wherein a recording density of the magnetic recording medium is 2 terabits/square inch or more.

Feature 20

The magnetic recording and reproducing device according to one of features 1 to 19, further comprising:

a suspension having one end and one other end; and an actuator arm, the magnetic head being mounted to the one end, the actuator arm being connected to the one other end, According to the embodiments, a magnetic recording and reproducing device having a higher resolution of reproduction is provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the magnetic recording and reproducing devices such as the magnetic recording medium, the magnetic head, the magnetoresistance effect element, the reproducing unit, the first shield, the second shield, the first nonmagnetic layer, the first interference layer, the second nonmagnetic layer, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all magnetic recording and reproducing devices practicable by an appropriate design modification by one skilled in the art based on the magnetic recording and reproducing devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording and reproducing device, comprising:
    a magnetic recording medium including a first surface, a plurality of bits being provided in the first surface, each of the bits having a direction of magnetization corresponding to recorded information; and
    a magnetic head including a reproducing unit having a second surface opposing the first surface, the reproducing unit sensing the direction of magnetization,
    the reproducing unit including:
        a first shield;
        a second shield separated from the first shield in a first direction parallel to the second surface;
        a first magnetic layer provided between the first shield and the second shield, a direction of magnetization of the first magnetic layer being fixed;
        a second magnetic layer provided between the first magnetic layer and the second shield, a direction of magnetization of the second magnetic layer being changeable;
        a third magnetic layer provided between the first shield and the first magnetic layer, a direction of magnetization of the third magnetic layer being changeable;
        a fourth magnetic layer provided between the second magnetic layer and the second shield, a direction of magnetization of the fourth magnetic layer being changeable;
        an intermediate layer provided between the first magnetic layer and the second magnetic layer;
        a first nonmagnetic layer provided between the first shield and the third magnetic layer, the first nonmagnetic layer including at least one selected from ruthenium, copper, and tantalum; and
        a second nonmagnetic layer provided between the fourth magnetic layer and the second shield, the second nonmagnetic layer including at least one selected from ruthenium, copper, and tantalum,
    a first distance between the first shield and the second shield being not less than 3 times and not more than 7 times a length of each of the bits along the first direction,
    a length along the first direction of the first nonmagnetic layer being 2 nanometers or less.

2. The device according to claim 1, wherein at least one selected from the third magnetic layer and the fourth magnetic layer includes at least one selected from iron, cobalt, nickel, an iron-cobalt alloy and an iron-nickel alloy.

3. The device according to claim 1, wherein a magnetic thickness of the third magnetic layer is not less than 2 times and not more than 4 times a magnetic thickness of the second magnetic layer.

4. The device according to claim 1, wherein a length along the first direction of the first nonmagnetic layer is not less than 0.4 nanometers and not more than 2 nanometers.

5. The device according to claim 1, wherein
    the first nonmagnetic layer includes ruthenium, and
    a length along the first direction of the first nonmagnetic layer is not less than 1.6 nanometers and not more than 1.9 nanometers.

6. The device according to claim 1, wherein
    the first nonmagnetic layer includes copper, and
    a length along the first direction of the first nonmagnetic layer is not less than 1.2 nanometers and not more than 1.7 nanometers.

7. The device according to claim 1, wherein the absolute value of an exchange coupling energy between a magnetization of the third magnetic layer and a magnetization of the first shield is not less than 0.05 erg/square centimeter and not more than 0.2 erg/square centimeter.

8. The device according to claim 1, wherein the second magnetic layer includes at least one selected from iron, cobalt, nickel, an iron-cobalt alloy, an iron-nickel alloy and a Heusler alloy.

9. The device according to claim 1, wherein the first magnetic layer includes at least one selected from iron, cobalt, nickel, an iron-cobalt alloy, an iron-nickel alloy and a Heusler alloy.

10. The device according to claim 1, wherein the reproducing unit further includes a seed layer provided between the third magnetic layer and the first magnetic layer, the seed layer including at least one selected from ruthenium, nickel, iron and chrome.

11. The device according to claim 10, wherein a length along the first direction of the seed layer is not less than 0.5 nanometers and not more than 5 nanometers.

12. The device according to claim 10, wherein the reproducing unit further includes an antiferromagnetic layer provided between the seed layer and the first magnetic layer, the antiferromagnetic layer including at least one selected from platinum, manganese, palladium, iridium and rhodium.

13. The device according to claim 1, wherein the intermediate layer includes at least one selected from copper and ruthenium.

14. The device according to claim 1, wherein the reproducing unit further includes a capping layer provided between the second magnetic layer and the fourth magnetic layer, the capping layer including at least one selected from ruthenium and tantalum.

15. The device according to claim 14, wherein a length along the first direction of the capping layer is not less than 2 nanometers and not more than 10 nanometers.

16. The device according to claim 1, wherein a length along the first direction of the third magnetic layer is not less than 4 nanometers and not more than 20 nanometers.

17. The device according to claim 1, wherein
the reproducing unit further includes a hard bias layer, and
the hard bias layer is provided between the first shield and the second shield, the hard bias layer being arranged with the second magnetic layer in a plane perpendicular to the first direction.

18. The device according to claim 1, wherein a minimum value of a length along the first direction of each of the bits is not less than 6 nanometers and not more than 15 nanometers.

19. The device according to claim 1, wherein a recording density of the magnetic recording medium is 2 terabits/square inch or more.

20. The device according to claim 1, further comprising:
a suspension having one end and one other end; and
an actuator arm,
the magnetic head being mounted on the one end,
the actuator arm being connected to the one other end.

* * * * *